United States Patent [19]
Kamiya et al.

[11] Patent Number: 5,850,215
[45] Date of Patent: Dec. 15, 1998

[54] DISPLAY APPARATUS FOR A CAR

[75] Inventors: Kazuo Kamiya; Shoji Yokoyama; Tatsumi Muramatsu, all of Anjo, Japan

[73] Assignee: Aisin Aw Co., Ltd., Aichi, Japan

[21] Appl. No.: 534,301

[22] Filed: Sep. 27, 1995

[30] Foreign Application Priority Data

| Mar. 20, 1995 | [JP] | Japan | 7-061262 |
| Mar. 20, 1995 | [JP] | Japan | 7-061412 |
| Mar. 20, 1995 | [JP] | Japan | 7-061413 |

[51] Int. Cl.$^6$ .................................................. G09G 5/00
[52] U.S. Cl. ........................ 345/204; 345/87; 345/213; 345/905; 361/681
[58] Field of Search ............... 345/87, 204, 213, 345/905; 348/837; 361/681, 682; 248/917, 919, 920

[56] References Cited

U.S. PATENT DOCUMENTS

| 4,809,078 | 2/1989 | Yabe et al. | 345/102 |
| 5,161,028 | 11/1992 | Kawata et al. | 348/837 |
| 5,173,686 | 12/1992 | Fujihara | 345/87 |

*Primary Examiner*—Jeffery Brier

[57] ABSTRACT

A display control circuit of a display unit is divided such that circuit portions and connecting means susceptible to noise are arranged in the display unit, while circuit portions and connecting means other than the circuit portions and connecting means susceptible to noise are placed away from the display unit through an extension cable. Due to this, the display unit can be made thinner and noises can be prevented from entering the circuit portions and connecting means arranged in the display unit. Further, the display apparatus may have a movement mechanism for making the display unit stand up. In this case, two guide grooves are formed at the sides of an intermediate case of the display unit housing. Due to this, the intermediate case can be made thinner, matching the thickness of the display unit.

23 Claims, 19 Drawing Sheets

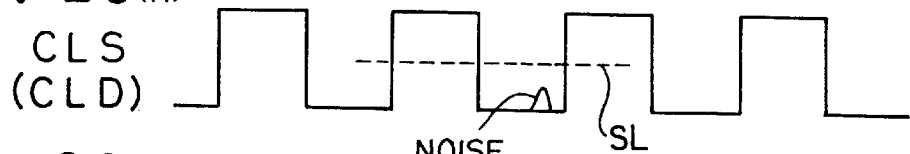
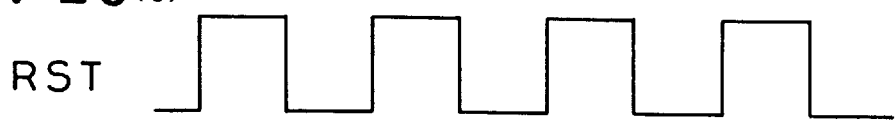
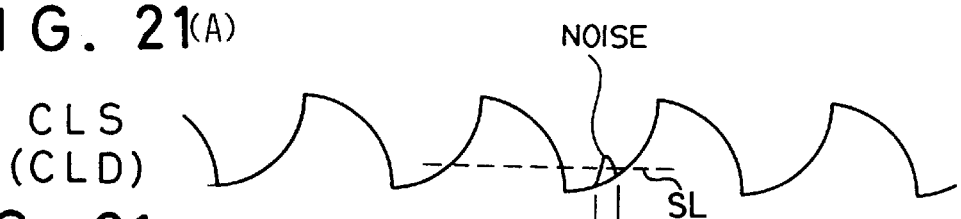
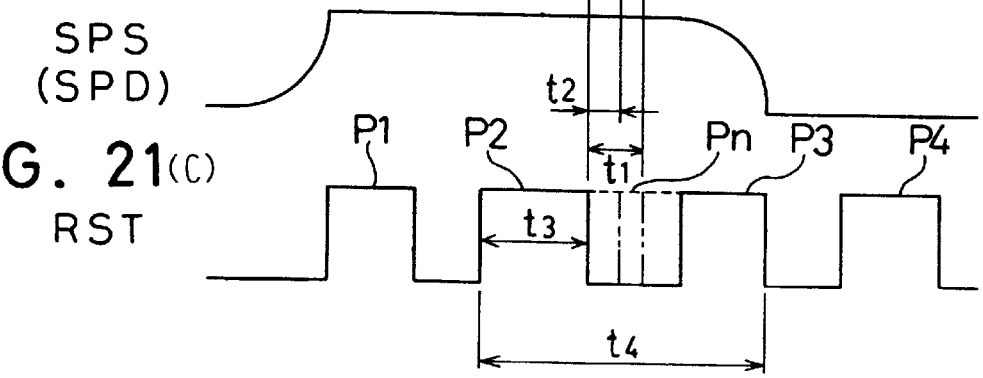

DISPLAY APPARATUS FOR A CAR

BACKGROUND OF THE INVENTION

1. Field of the Invention

The present invention relates to a display apparatus for a car, more particularly relates to a display apparatus in which the display control circuit is divided to enable the device to be made thinner and deterioration of the picture quality to be prevented and having a stand-up mechanism for its display unit suitable for reducing the thickness.

2. Description of the Background Art

FIG. 18 shows a display unit of a car (motorcar) navigation system of the related art. A backlight 6 is arranged on the rear surface of a scanning line type thin film transistor (TFT) color liquid crystal display panel 1. A circuit board 21 is provided on the rear surface of this backlight 6. On this board 21 is mounted control circuit 22 for the liquid crystal display panel 1. Output signals from the control circuit 22 are sent through leads 24 to input terminals 23 provided on the side of the liquid crystal display panel 1. The control circuit 22, as shown in FIG. 19, receives video signals sent from an image processor in the body of the navigation system, not shown. This control circuit 22 outputs the digital synchronization signals CLS, SPS, CLD, and SPD and the analog video signals of the primary color signals RGB.

In recent years, the display unit of many car navigation systems have been housed in the dashboards or console panels of cars. Many devices are mounted in cars, however, so there is little space remaining in them. Accordingly, when a display unit is housed in the dashboard or console panel, the display unit has to be made thinner. There is also little space for accommodating the circuit board, so it is demanded that circuit board be made easier to install. In the above related art, however, the control circuit 22 is arranged at the rear surface of the backlight 6, so it is not possible to reduce the thickness d of the display unit. If a conventional display unit were to be accommodated in a "1DIN" (Deutsche Industrie Normen, i.e., German Industry Standard) space having an opening of the prescribed dimensions of 178 mm×50 mm, the 1DIN space would become full with just the display unit and other devices could not be further held.

If the control circuit 22 were to be moved to another location away from the rear surface of the backlight 6, the thickness of the display unit would become just the thickness of the liquid crystal display panel 1 and the backlight 6 and therefore the display unit would become thinner. If the signal lines connecting the control circuit 22 and the liquid crystal display panel 1 are long, however, distortion will occur in the signal waveforms and noise will enter from the signal lines and therefore the picture quality will frequently deteriorate. If the signal lines are short, for example, as shown in FIGS. 20(a)–20(c), the digital synchronization signals CLS, SPS, CLD, and SPD from a control signal generating circuit 19 will assume a stable pulse-like waveform. Accordingly, even if a small amount of noise enters from the signal lines, the output pulse RST of registers will have normal waveforms and timings. These registers are positioned in X-drivers 31 or Y-drivers 33 shown in FIG. 4.

As opposed to this, if the control circuit 22 and the liquid crystal display panel 1 are far from each other, the signal lines for sending the synchronization signals CLS, SPS, CLD, and SPD will become longer. Therefore, the reactance, capacitance, resistance, and other inductance or impedance components of the signal lines will change, whereby, as shown in FIGS. 21(a)–21(c), the waveforms of the synchronization signals CLS, SPS, CLD, and SPD will become deformed. This deformation at some times constitutes distortion which causes the level of the low level component to rise and the low level component to approach the threshold level. Further, this deformation at other times constitutes distortion which causes the level of the high level component to fall and the high level component to approach the threshold level. This deformation at still other times constitutes both such distortions whereby the low level component and the high level component approach each other.

The following explanation relates to the distortion in the case where the level of the low level component rises. If the low level component approaches the threshold level, the low level time t1 of the clock signal CLS (CLD) becomes shorter. Further, the ON (high level) time t3 of the output pulse RST of the register becomes longer. Also, due to this deformation of the waveforms of the synchronization signals CLS, SPS, CLD, and SPD, the levels of the pulse-like low level components of the synchronization signals become higher. Accordingly, if noises enter, the noises levels will easily exceed the threshold level SL.

If this happens, a short noise pulse Pn will frequently occur among the normal pulses P1, P2, P3, P4, . . . of the register output RST. If this happens, the number of pulses will increase by one. If for example the above noise enters the gate driving clock signal CLS and the noise pulse Pn occurs between the output pulses P2 and P3 of the registers of the X-drivers 31, the ON positions in the X-axial direction of the pixel array 30 will be shifted to the right by exactly one dot. Therefore, the situation will continue of the ON positions in the X-axial direction being shifted to the right by exactly one dot from the occurrence of the noise pulse Pn until the next start signal is generated. As a result, the picture will flicker.

In the same way, if the above-mentioned noise enters the source driving clock signal CLD and a noise pulse Pn occurs between the output pulses P2 and P3 of the registers of the Y-drivers, the ON positions in the Y-axial direction of the pixel array 30 will shift by exactly one line. Accordingly, the situation will continue of the horizontal lines being shifted to the bottom by exactly one line from the occurrence of the noise pulse Pn to the end of the field. It returns to its original state at the time of the start of the next field. Therefore, again the picture will flicker.

If the above-mentioned noise enters, further, as shown by t2 in FIGS. 21(a)–21(c), the time where the clock signal CLS (CLD) is at a low level will become further shorter. If this happens, the low level will not be detected. Accordingly, the register output RST will not be turned OFF and the ON (high level) state will continue until the next clock signal CLS (CLD) becomes the low level. As a result, as shown by t4 in FIG. 21(c), two pulses will become connected, the ON time (high level) of the pulse RST will become longer, and the number of pulses will be reduced by one.

Therefore, if the above-mentioned noise enters the gate driving clock signal CLS, the output pulses P2 and P3 of the registers of the X-drivers 31 will be connected to form a single pulse and the ON time will become longer as shown by t4. In this case, the number of pulses will be reduced by one, whereby the ON positions on the X-axis of the pixel array 30 will be shifted to the left by exactly one dot. Accordingly, the situation will continue of the ON positions in the X-axial direction being shifted to the left by exactly one dot from the occurrence of the noise pulse Pn until the next start signal is generated. As a result, the opening time of dot opened by the output pulse P2 on the pixel array 30 will become longer until t4. This dot is on the pixel array 30 and is opened by the output pulse P2. The dot will shine whitely on a relative basis and therefore the picture quality will deteriorate.

If further the above-mentioned noise enters the source driving clock signal CLD, the output pulses P2 and P3 of the registers of the Y-drivers will connect and form a single pulse. In this case, the number of pulses will be reduced by one, whereby the ON positions in the Y-axial direction of the pixel array 30 will shift by exactly one line. Accordingly, the situation will continue of the horizontal lines being shifted to the top by exactly one line from the occurrence of the noise pulse Pn to the end of the field. It returns to its original state at the time of the start of the next field. Therefore, again the picture will flicker. In this way, if the signal lines for sending the synchronization signals are long, noise will easily enter the synchronization signals. Accordingly, noise will enter and white spots will appear in the picture or the synchronization will become poor. Therefore, the picture quality will decline. This effect of noise becomes greater the longer the signal lines. The above-mentioned errors also occur when deformation occurs in which the level of the high level component becomes lower.

Further, to make the display unit thinner, the mechanism for moving the display unit must also be made thinner.

SUMMARY OF THE INVENTION

The present invention was made so as to solve the above-mentioned problems. The first object of the present invention is to divide the display control circuit so as to make the display unit thinner. The second object of the present invention is to make the movement mechanism of the display unit thinner.

To achieve these objects, in the present invention, the circuit portions or connecting means susceptible to noises are arranged at a display unit. The circuit portions or connecting means other than these circuit portions or connecting means are provided away from the display unit through an extension cable.

By this, the signal lines connecting the above-mentioned circuit portions or connecting means with the display unit become shorter and there is less entry of noises in the signal lines. Accordingly, the picture quality does not deteriorate. Further, the display unit becomes lighter and thinner. In addition, the number of circuits and components of the circuit portions provided at the display unit becomes smaller, whereby the display unit is made smaller in facial area and overall size without changing the size of the display screen. Further, the extension cable is flexible, so it can be freely placed anywhere and its length can be changed. As a result, the circuits connected to the display unit through the extension cable may be positioned at any desired location or space.

Further, the present invention may provide a movement mechanism for making the display unit stand up and retract. Further, the present invention may provide a case for accommodating the display unit, display control circuit, and movement mechanism.

Since the display unit becomes lighter, the power required for moving the display unit becomes smaller. Accordingly, the drive unit for moving the display unit can be made very small in capacity and size. Due to this, the movement mechanism becomes compact and the power consumption becomes smaller. The load on the parts of the movement mechanism becomes smaller as well. Therefore, inexpensive parts with a lower strength can be used and the lifetime of the parts can be improved.

Since the display unit is thinner, the case can be made thinner. Further, other devices can be accommodated in the case. In addition, it is possible to arrange circuit portions connected to the display unit through the extension cable inside the other devices accommodated in the case.

Further, the movement mechanism may be constituted by an intermediate case movable with respect to a fixed case and brackets for moving the display unit. Two guide grooves are then formed at the sides of the intermediate case.

Since just two guide grooves are formed at the sides of the intermediate case, the intermediate case becomes thinner matching the thickness of the display unit. Due to this, it becomes easy to install the display apparatus of the present invention in the limited space of the console panel of a car.

Further, since the display apparatus is thin, it can be accommodated in the fixed case along with a device for driving a storage means and a control device. Accordingly, the data transmission device can be made as a single unit.

In particular, if the present invention is applied to a car navigation system, the display apparatus, CD-ROM drive device, and navigation control unit can be accommodated in a 1DIN space.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIGS. 20(a)–20(c) shows the waveforms of the synchronization signals and register output in the case of short signal lines.

FIGS. 21(a)–21(c) shows the waveforms of the synchronization signals and register output in the case of long signal lines.

DESCRIPTION OF THE PREFERRED EMBODIMENTS

Figure 1:
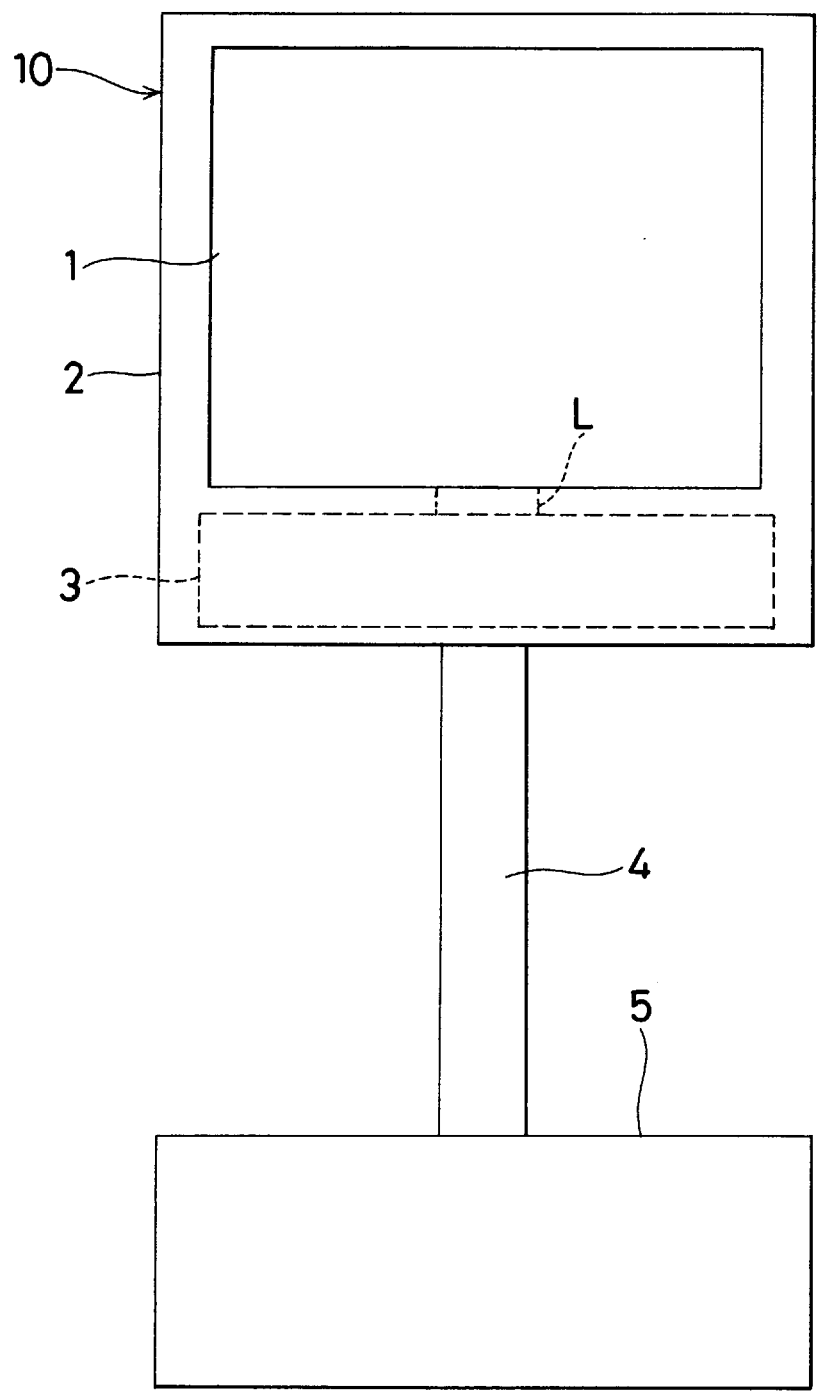
FIG. 1 is a plane view of a display unit and circuit board.
Figure 2:
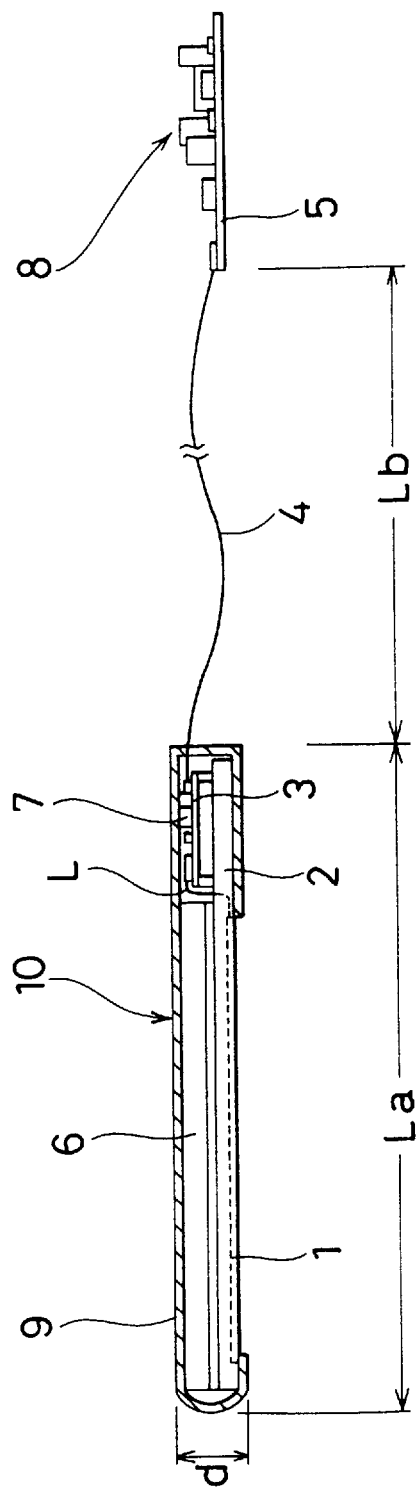
FIG. 2 is a side view of a display unit and circuit board.

As shown in FIG. 1 and FIG. 2, a first board 3 is arranged adjoining a liquid crystal display panel 1. On this first board 3 is mounted a digital synchronization control circuit 7. This synchronization control circuit 7 produces signals which are susceptible to noises. If the signal lines of the synchronization control circuit 7 are long, the waveforms of the signals become deformed and the levels of the low level components of the signals become higher or the levels of the high level components of the signals become lower. A second board 5 is connected through an extension cable 4 to the liquid crystal display panel 1. On this second board 5 is mounted a video signal processing circuit 8. The video signal processing circuit 8 is resistant to the effects of noises even if the signal lines are long. Due to this, the picture quality does not deteriorate. Further, the display unit 10 can be made thinner and lighter.

Figure 5:
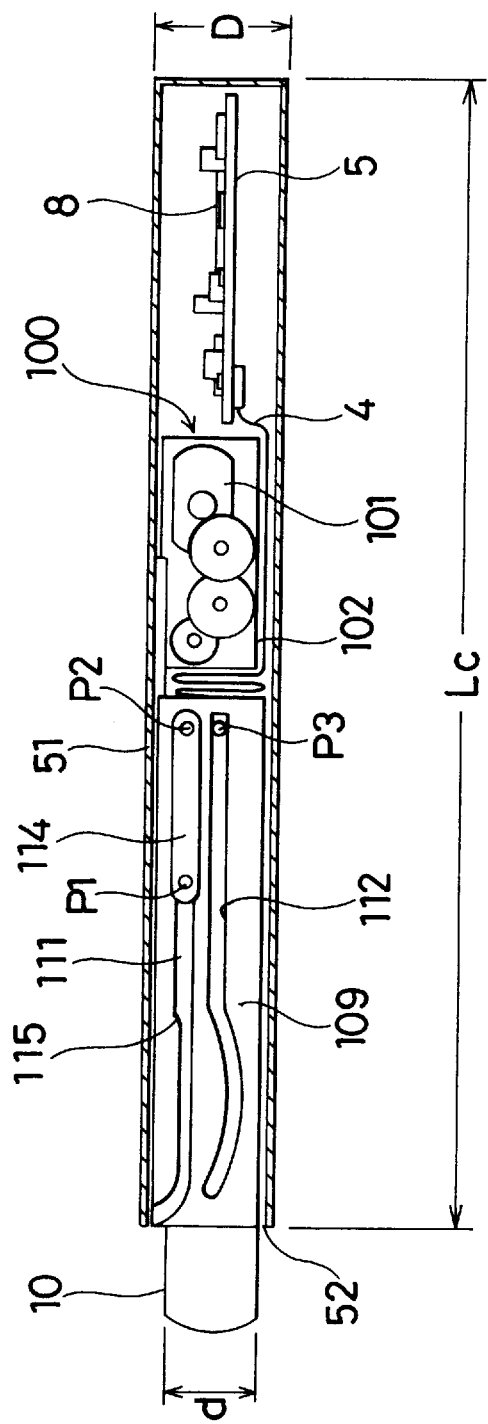
FIG. 5 is a cross-sectional side view of a display apparatus.

As shown in FIG. 5, further, the display unit 10, movement mechanism 100, and second board 5 are accommodated in a case 51. The movement mechanism 100 causes the display unit 10 to stand up from the case 51 and retract into the case 51.

Since the display unit 10 is light, the display unit 10 can be made to stand up by a small drive force. Accordingly, the capacity and size of the drive unit for making the display unit 10 pop up may both be made smaller. Thanks to this, the movement mechanism 100 becomes compact. Further, the case 51 becomes thinner matching the thinner display unit 10.

Figure 11:
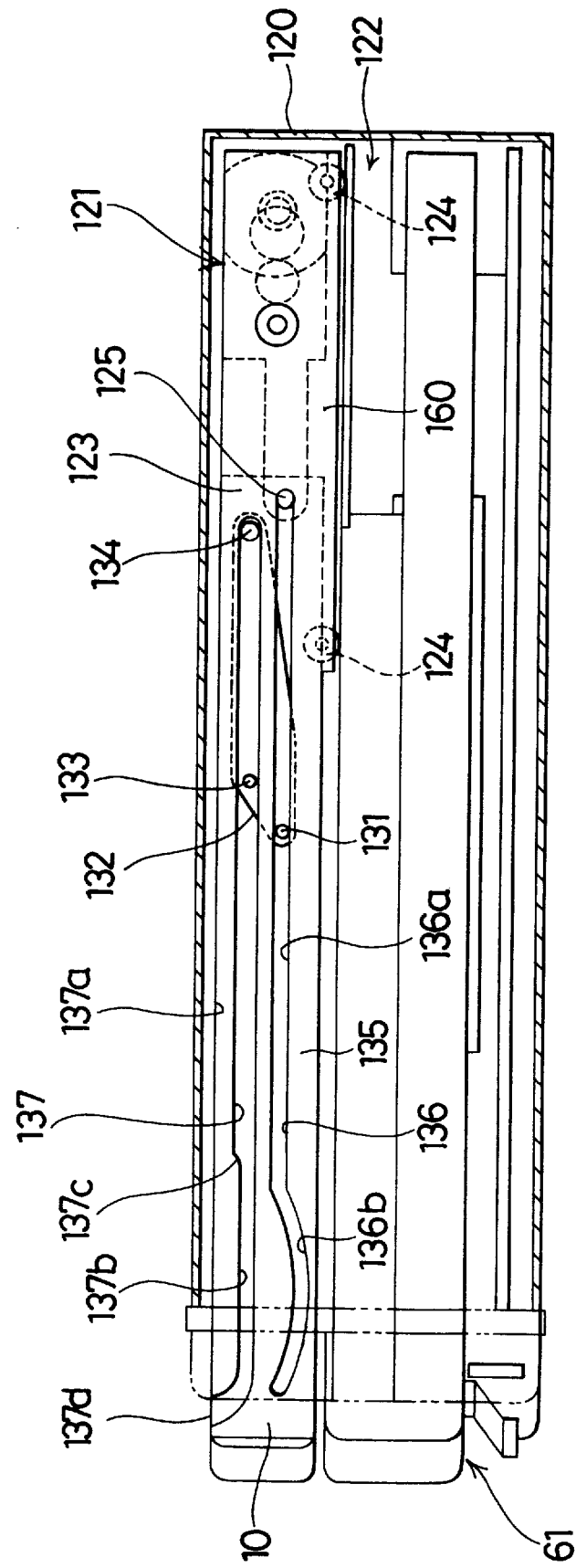
FIG. 11 is a cross-sectional side view of a display apparatus at the time when the display apparatus is used for a car navigation system.

As shown in FIG. 11, the movement mechanism 100 is comprised of an intermediate case 123 and movement brackets 160. The intermediate case 123 can be moved with respect to the fixed case 120. The movement brackets 160 move the display unit 10. At the sides of the intermediate case 123 are formed two guide grooves 136, 137. Due to this, the intermediate case 123 becomes thinner in the same way as the display unit 10.

1. Display Unit and Display Control Circuit

As shown in FIG. 1, the display unit 10 is comprised of a liquid crystal display panel 1, a frame 2, and a first board 3. The liquid crystal display panel 1 is flat in shape and is comprised of a video display-use scanning line type TFT color liquid crystal display device. The frame 2 is a rectangle which holds the liquid crystal display panel 1. The first board 3 is arranged at the bottom part of the frame 2 adjoining the liquid crystal display panel 1. The second board 5 is connected to the display unit 10 through a flexible extension cable 4.

As shown in FIG. 2, a backlight 6 is arranged at the rear surface of the liquid crystal display panel 1 and lights up the liquid crystal display screen from the back. The liquid crystal display panel 1, frame 2, first board 3, and backlight 6 are accommodated in a thin box-shaped case 9. The thickness d of the display unit 10 is the thickness of the backlight 6 and case 9 combined. Note that the case 9 may be omitted.

On the first board 3 is mounted a digital synchronization control circuit 7. On the second board 5 is mounted a video signal processing circuit 8. The display drive circuit and display control circuit of the liquid crystal display panel 1 are divided into synchronization control circuit 7 and video signal processing circuit 8. The first board 3 and the second board 5 are connected by the extension cable 4. The output signal of the video signal processing circuit 8 is carried on this extension cable 4. The digital synchronization control circuit 7 and the liquid crystal display panel 1 are connected by short signal lines L. The signal lines L may be printed interconnections or extremely short leads. Note that the power circuits of the motor 101 and the backlight 6 are also mounted on this second board 5. The conductors for sending power from the power circuits to the motor 101 and the backlight 6 may be integrated with the extension cable 4 or laid separate from the extension cable 4.

2. Display Control Circuit

Figure 3:
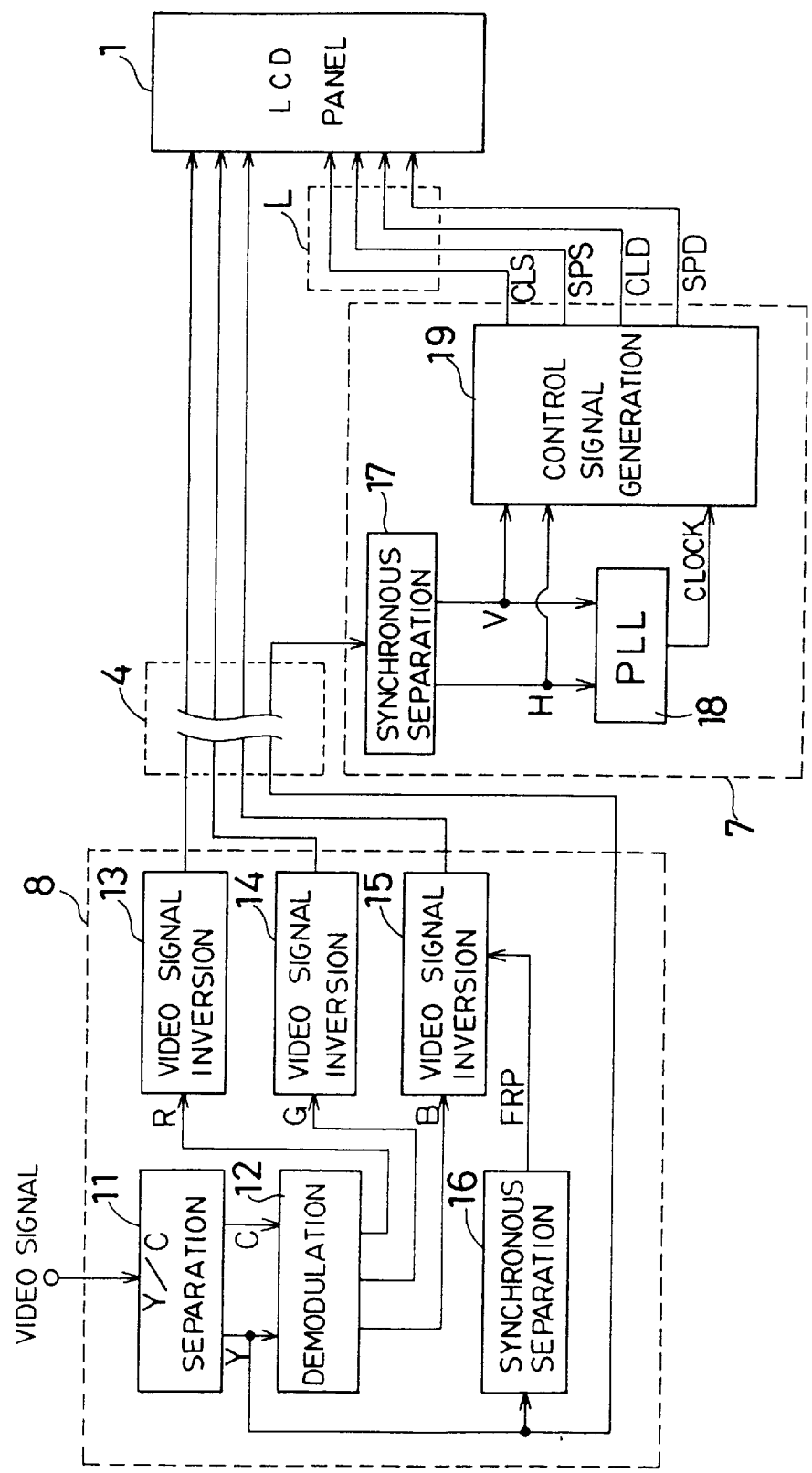
FIG. 3 is a block diagram of a display control circuit.

FIG. 3 shows the synchronization control circuit 7 and the video signal processing circuit 8. A video signal is sent for example from the main unit of a navigation system or a TV tuner or other video signal output circuit (not shown). The video signal is separated by a Y/C separation circuit 11 into a luminance signal Y including a composite synchronization signal and a color signal C. A demodulation circuit 12 produces the primary color signals RGB from the color signal C. The primary color signals are RGB signals of luminances in accordance with the luminance signal Y. A synchronization separation circuit 16 produces a timing signal FRP from the synchronization signal included in the luminance signal Y. The timing signal FRP is inverted with each field. Video signal inversion circuits 13 to 15 invert the primary color signals RGB every field and send the results through the extension cable 4 to the liquid crystal display panel 1.

The luminance signal Y is sent through the extension cable 4 to the synchronization control circuit 7. A synchronization separation circuit 17 separates the vertical synchronization signal V and the horizontal synchronization signal H included in the luminance signal Y and sends these signals to a control signal generating circuit 19 and a phase locked loop (PLL) circuit 18. The PLL circuit 18 produces a clock signal for pixels synchronized with the vertical synchronization signal V and the horizontal synchronization signal H and sends the clock signal to the control signal generating circuit 19.

The control signal generating circuit 19 produces the gate driving clock signal CLS, the gate driving start signal SPS, the source driving clock signal CLD, and the source driving start signal SPD from the vertical synchronization signal V, horizontal synchronization signal H, and clock signal and sends these signals to the liquid crystal display panel 1. The gate driving clock signal CLS gives the timing for each dot in the horizontal direction. The gate driving start signal SPS gives the start timing for each line in the horizontal direction. The source driving clock signal CLS gives the timing for each line in the vertical direction. The source driving start signal SPD gives the start timing for each field in the vertical direction.

Figure 4:
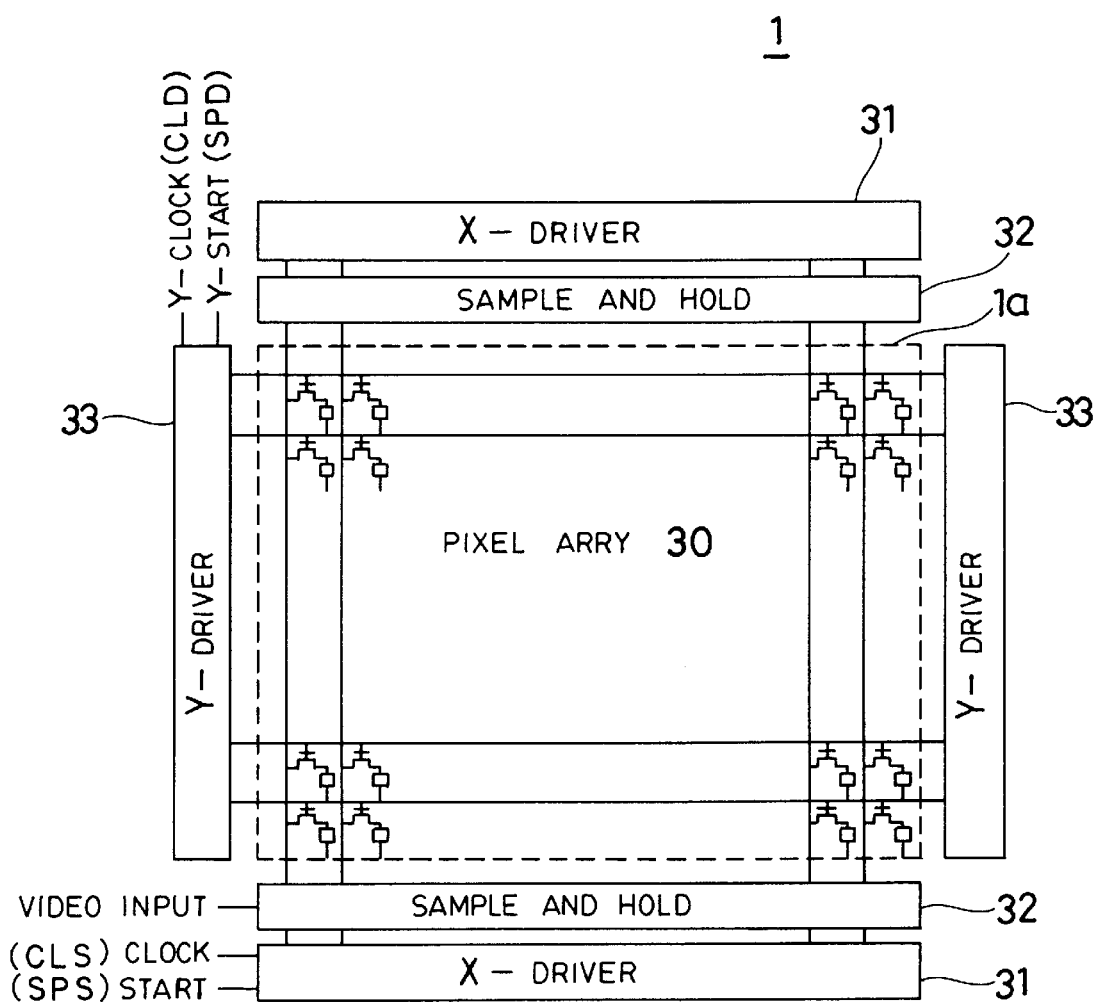
FIG. 4 shows the drive circuit of a liquid crystal display panel.

As shown in FIG. 4, a pixel array 30 is provided on the liquid crystal display device 1a of the liquid crystal display panel 1. This pixel array 30 is comprised of thin film transistors arranged in a matrix. These thin film transistors perform switching operations for each pixel. At the edges of the liquid crystal display panel 1 are provided X-drivers 31, sample and hold circuits 32, and Y-drivers 33. The X-drivers 31 drive the source lines of the pixel array 30. The sample and hold circuits 32 supply the video input signals. The Y-drivers 33 drive the gate lines. The synchronization signals input to the X-drivers 31 are the gate driving clock signal CLS and the gate driving start signal SPS. The synchronization signals input to the Y-drivers 33 are the source driving clock signal CLD and the source driving start signal SPD.

The synchronization control circuit 7 and the liquid crystal display panel 1 are connected by short signal lines L. The synchronization signals CLS, SPS, CLD, and SPD are sent through these short signal lines L to the liquid crystal display panel 1. Therefore, there is little entry of noises in the signal lines L from the outside. Further, there is little deformation of the waveforms of the synchronization signals CLS, SPS, CLD, and SPD.

Accordingly, the noises will not exceed the threshold level SL and the low level components will not become higher than the threshold level SL. Further, the high level components will not become lower than the threshold level SL. Accordingly, signals of normal waveforms as shown in FIGS. 20(a)–20(c) are sent to the liquid crystal display panel 1. Therefore, even if noise enters, there is no effect of the noise as explained above and the number of the output pulses RST of the register does not change. Due to this, the ON (high level) time and timing of the output pulses RST of the registers do not change. Therefore, no white spots occur in the picture and the synchronization of the picture is not lost. Accordingly, the picture quality is not deteriorated.

As opposed to this, waveform deformation occurs in the primary color signals RGB and luminance signal Y carried on the extension cable 4 due to the impedance or inductance of the extension cable 4. This deformation causes the level of the luminance signal Y to fall and the display screen to become darker. Further, this deformation causes the level of the primary color signals RGB to fall and the red, green, or blue of the picture as a whole to increase. These problems, however, can be easily dealt with by adjusting the brightness knob or the color knobs. Further, they are minor errors compared with error of deviation of the pixels or frame, error of white pixels or a white frame, and error of a flickering picture.

As explained above, the second board 5 is connected to the display unit 10 through the flexible extension cable 4. This extension cable 4 can be freely bent. Further, the length of the extension cable 4 can be easily changed to a desired length. Accordingly, the position at which the second board 5 is accommodated is no longer limited.

Further, as explained, the luminance signal Y sent from the Y/C separation circuit 11 to the synchronization separation circuit 17 is carried over the extension cable 4. This luminance signal Y is separated by the synchronization separation circuit 17 into the vertical synchronization signal V and the horizontal synchronization signal H. These signals V and H are subjected to feedback of timing, that is, phase adjustment, by the clock signal produced by the PLL circuit 18. Therefore, even if noises disturb the luminance signal Y, the noises are eliminated by the PLL circuit 18. Accordingly, the control signal generating circuit 19 is not affected by noises and can produce normal synchronization signals CLS, SPS, CLD, and SPD.

The circuits and components placed adjoining the display unit 10 are limited to the control signal generating circuit 19, PLL circuit 18, synchronization separation circuit 17, etc., for which effects of noises have to be avoided. Accordingly, it is possible to make the display unit 10 smaller in size without changing the area of the liquid crystal display panel 1 and the backlight 6, that is, the area of the display screen.

Further, as explained above, the video signal processing circuit 8, which is not susceptible to external noise, is placed away from the liquid crystal display panel 1 by the extension cable 4. Due to this, the thickness d of the display unit 10 is reduced to the thickness of just the liquid crystal display panel 1 and the backlight 6 and therefore the display unit 10 becomes thinner. Further, the number of circuits and components of the synchronization control circuit 7 positioned at the frame 2 become smaller and so the size of the circuit becomes smaller, so the display unit 10 as a whole can be kept small in size and the display unit 10 as a whole becomes lighter. Further, the display unit 10 can be accommodated in a small space in the car dashboard or console panel.

3. Display Apparatus Having Case

As shown in FIG. 5, the display unit 10 and second board 5 are accommodated in a flat box-shaped case 51. A movement mechanism 100 is accommodated in the case 51 as well. The thickness D of the case 51 is substantially equal to the thickness d of the display unit 10, so the display apparatus becomes thinner.

An opening 52 is formed at the front end of the case 51. The second board 5 is affixed at the rear of the inside of the case 51 and is connected to the display unit 10 through a flexible extension cable 4. The movement mechanism 100 is positioned in front of the second board 5.

Figure 6:
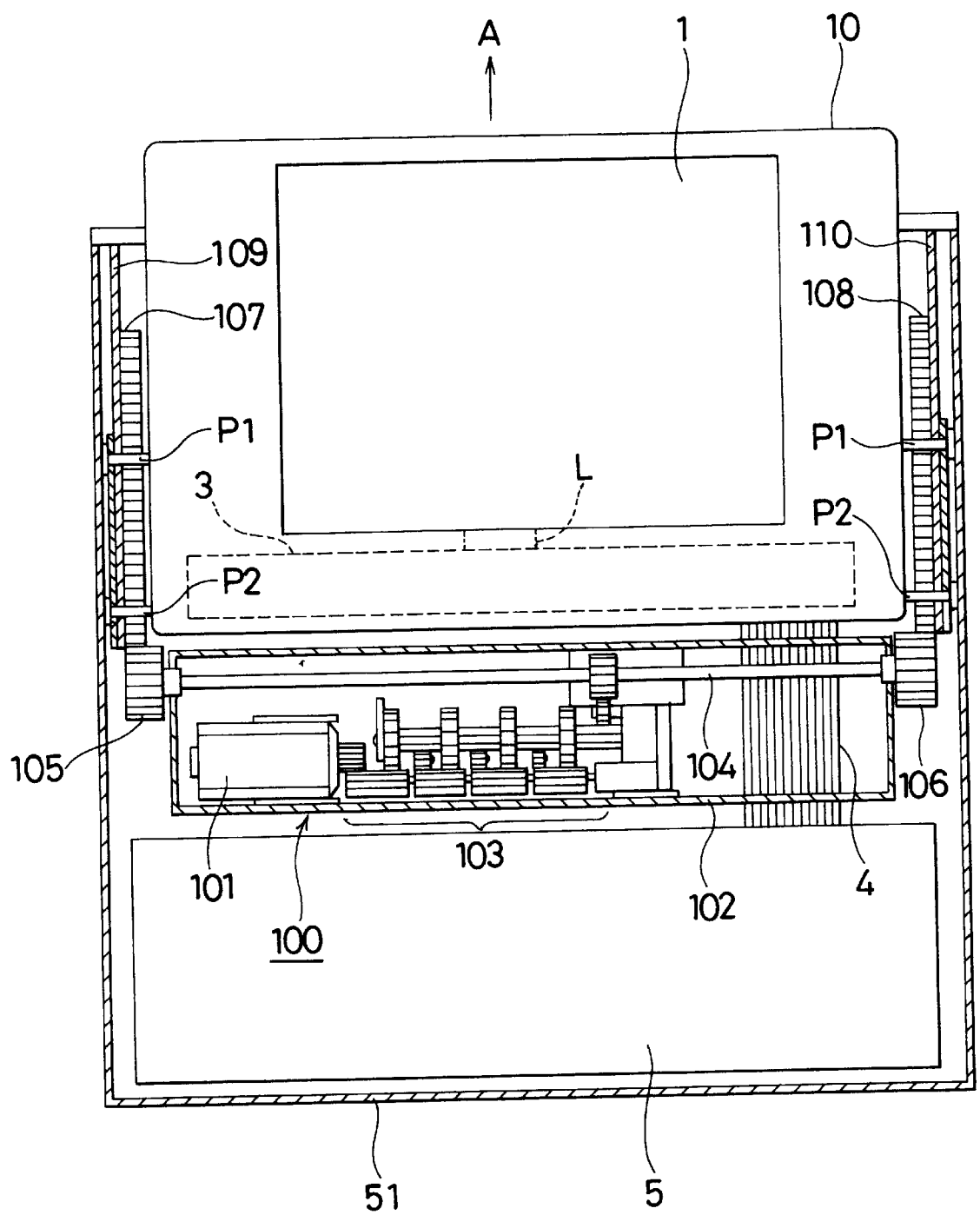
FIG. 6 is a plane view of the inside of the case 51 of a display apparatus.

As shown in FIG. 6, a gear box 102 is arranged in the width direction of the case 51 between the display unit 10 and the second board 5. This gear box 102 accommodates a motor 101, reduction gear train 103, and output shaft 104. The rotation of the motor 101 is slowed by the reduction gear train 103 and then given to the output shaft 104. The output shaft 104 is supported by the gear box 102 in a rotatable manner. At the two ends of the output shaft 104 are affixed pinions 105 and 106. At the two sides of the top inside surface of the case 51 are provided rack gears 107 and 108. The pinions 105 and 106 engage with the rack gears 107 and 108. The gear box 102 and the display unit 10 are connected by links, not shown. When the gear box 102 moves forward or back, the display unit 10 therefore also moves forward or back. At the two sides of the display unit 10 are arranged the movement plates 109 and 110 which can slide in the forward or rear directions. As shown in FIG. 5, the movement plates 109 and 110 are formed with two slits 111 and 112. At the two sides of the display unit 10 are provided three pins P1, P2, and P3 which can move in the slits 111 and 112. A link 114 bridges the distance between the pins P1 and P2. The pin P2 has a larger diameter than the pin P1. As shown in FIG. 5, a stopper 115 comprised of a narrowed width of the groove is formed in the middle of the slit 111.

The state shown in FIG. 5 and FIG. 6 is the state where the display unit 10 is retracted in the case 51. If the motor 101 is driven from this state, the pinions 105 and 106 turn and the gear box 102 moves forward in the direction of the arrow A. Due to this, the display unit 10 also moves forward in the direction of the arrow A. When the pin P2 reaches the stopper 115, the pin P2 is blocked from forward movement by the stopper 115. Due to this, the forward movement of the display unit 10 is stopped. When the pin P2 reaches the stopper 115, the rear end of the display unit 10 has exited from the opening 52.

Figure 7:
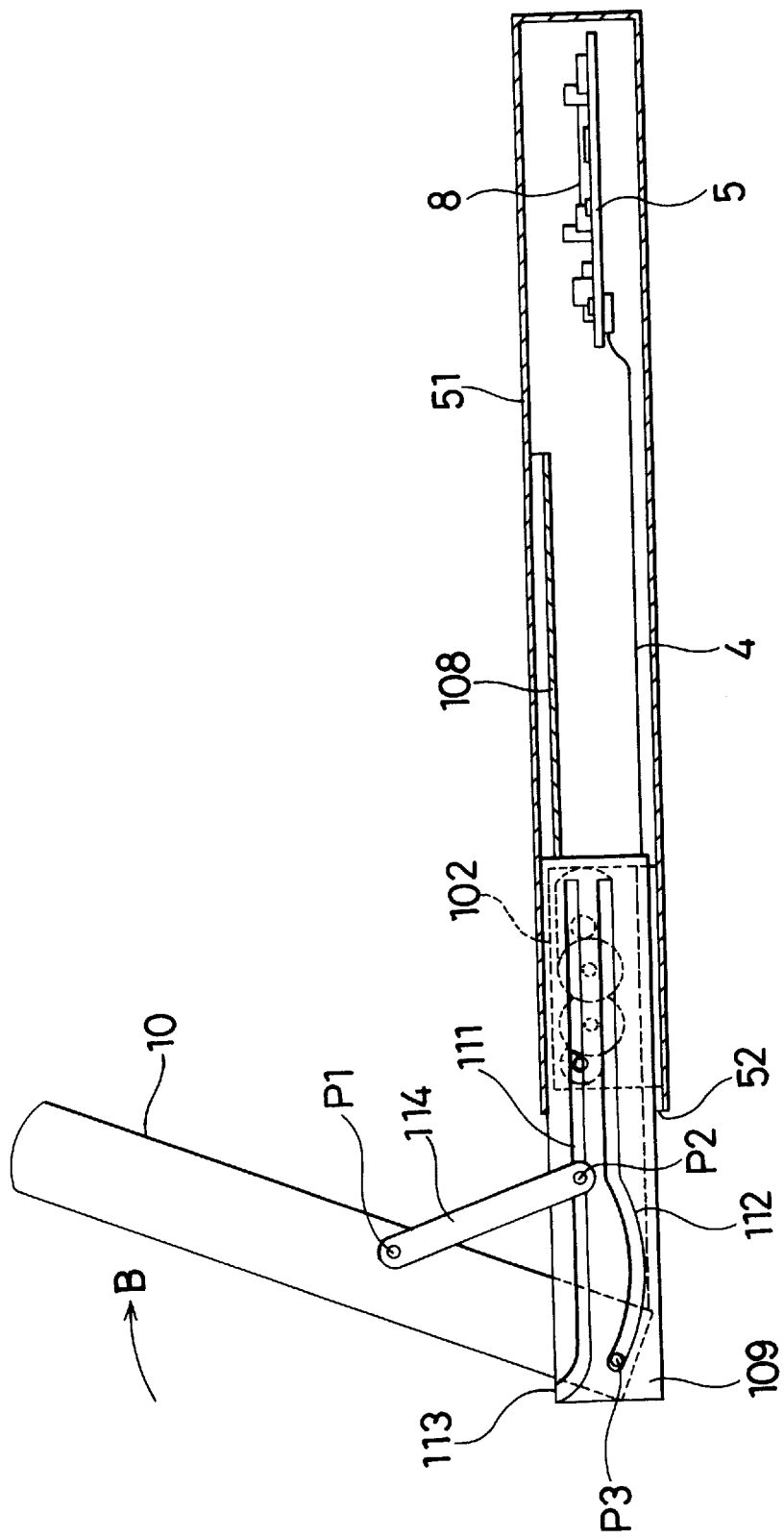
FIG. 7 is a cross-sectional side view of a display apparatus at the time when the display unit is popped up.

The motor 101 continues to operate even after the pin P2 has reached the stopper 115 and so the gear box 102 moves forward further. Due to this, the rear end of the display unit 10 is pushed forward and, as shown in FIG. 7, the pin P1 exits from the opening 113 of the slit 111. The link 114 swivels upward about the pin P2 and the display unit 10 is made to pop up in the direction of the arrow B. When the pin P3 reaches the front end of the slit 112, the motor 101 is stopped and so the display unit 10 is held at an angle giving it a slight tilt to the rear from the vertical. When the display unit 10 is to be retracted into the case 51, the motor 101 operates in reverse and a reverse operation to the above is performed.

When the display unit 10 is retracted in the case 51, as shown in FIG. 5, the extension cable 4 is bunched up between the display unit 10 and the gear box 102. When the display unit 10 is popped up, as shown in FIG. 7, the front end of the extension cable 4 follows the rear end of the display unit 10 and is pulled out to the front of the case 51. Accordingly, as shown in FIG. 2, the length Lb of the extension cable 4 is made longer than the longitudinal length La of the display unit 10. Due to this, the stand-up operation of the display unit 10 is not obstructed by the extension cable 4. Further, the second board 5 is able to be affixed to the rear of the inside of the case 51.

Since the length La of the display unit 10 in the longitudinal direction is shorter than the length Lc of the case 51 in the longitudinal direction, the movement mechanism 100 and the second board 5 can be accommodated aligned in the longitudinal direction of the case 51. Further, the second board 5 may be placed at a position away from the display unit 10.

Since the display unit 10 is light, the capacity of the motor 101 of the movement mechanism 100 may be smaller. Accordingly, the power consumption of the motor 101 becomes smaller and the size of the motor 101 becomes smaller. Further, the strength of the movement mechanism 100 may be smaller than in the related art. Accordingly, it is possible to use small gears and thin members. Therefore, the cost becomes lower.

Figure 8:
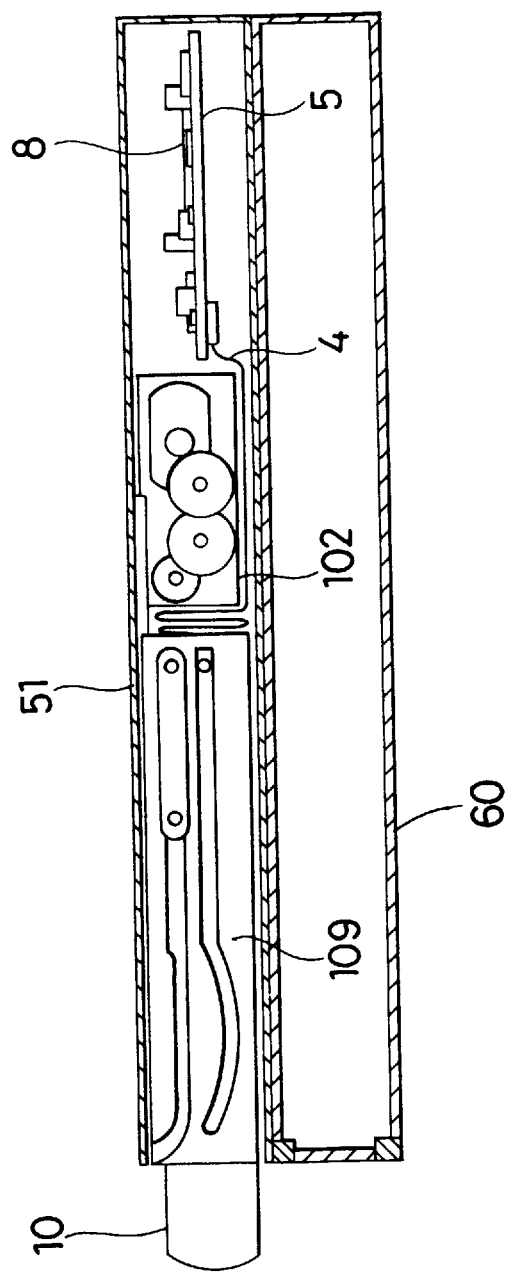
FIG. 8 is a cross-sectional side view of a display apparatus at the time when a case 60 for accommodating other devices is provided below the case 51.
Figure 9:
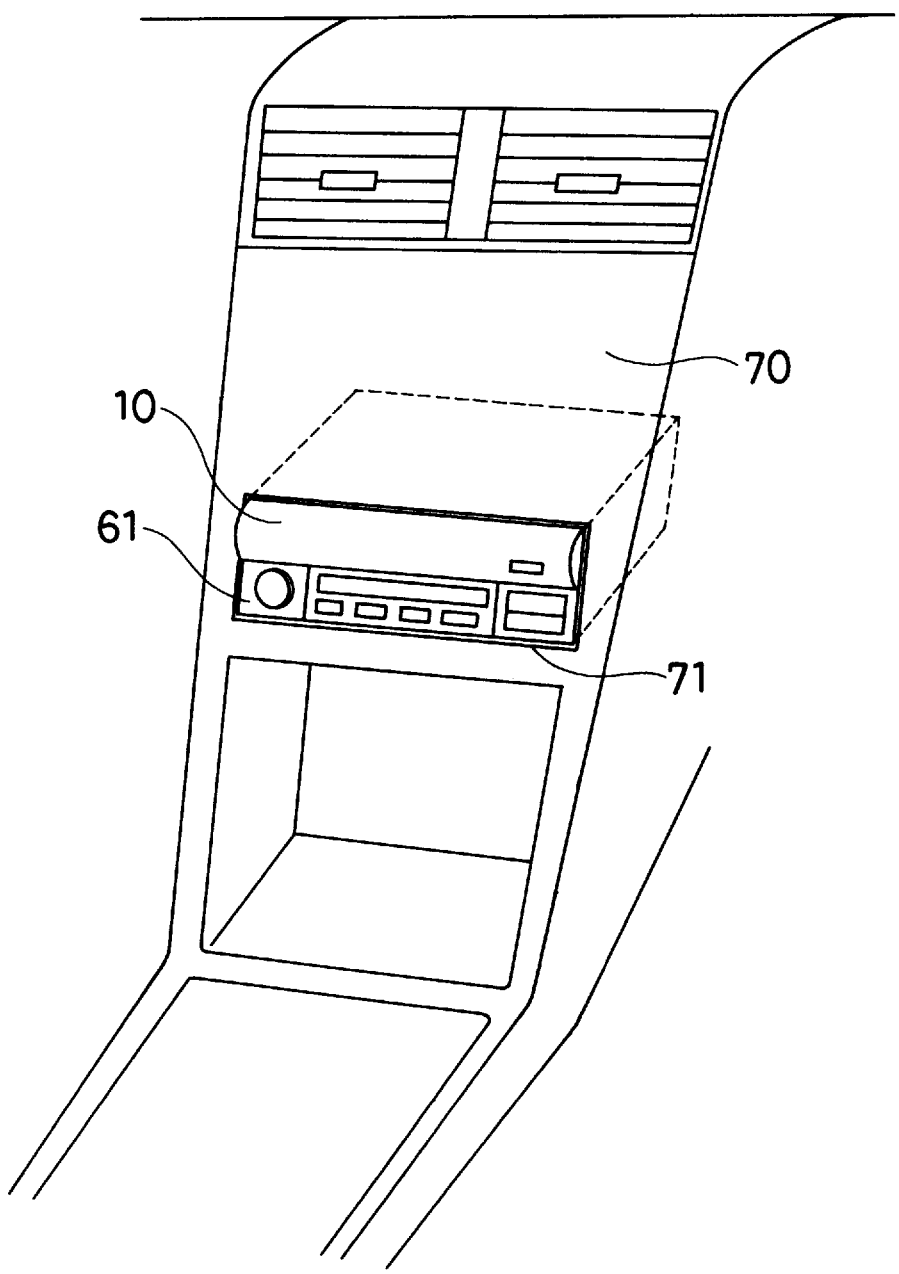
FIG. 9 is a perspective view of the state where the display apparatus is accommodated in a 1DIN space 71 along with a CD player 61.

Since the display unit 10 is thin, it becomes possible to accommodate the display unit 10 together with other devices in a small 1DIN space. In this case, as shown in FIG. 8, a case 60 in which another device is accommodated is provided integrally at the bottom (or top) of the case 51. For example, the display unit 10 is a display unit of a car navigation system, and a CD player 61 may be accommodated in the case 60. The CD player 61 reads a CD (compact disc) on which map data etc. for navigation use is recorded. As shown in FIG. 9, the display unit 10 and CD player 61 are accommodated in the 1DIN space 71 of the car console panel 70. Note that the device accommodated in the case 60 may also be a TV tuner, audio tape player, radio, or other device.

Figure 10:
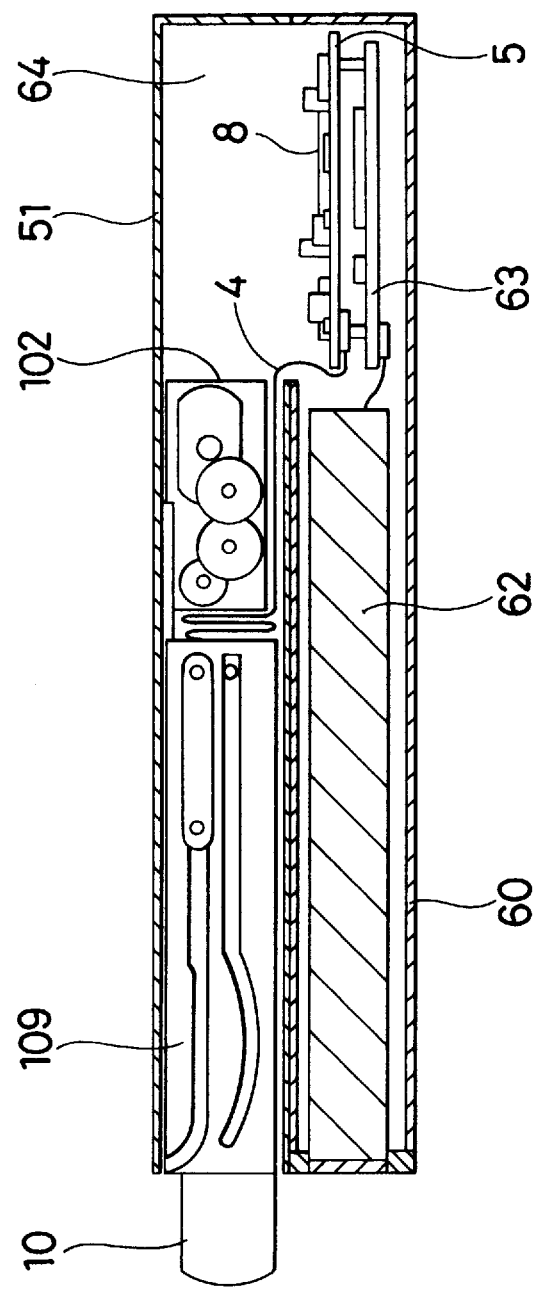
FIG. 10 is a cross-sectional side view of a display apparatus at the time when a video signal processing circuit 8 is accommodated in a case 60.

Further, as shown in FIG. 10, the case 51 and the case 60 in which the other device 62 is accommodated may be made a single unit. A board 63 is affixed at the rear of the inside of the case 60. On the board 63 is mounted the control circuit of the device 62. The second board 5 is made integral with the board 63. Due to this, a space 64 is created at the rear of the inside of the case 51. Accordingly, for example, it is possible to accommodate a global positioning system (GPS) sensor of the navigation system or other devices in this space 64. Further, the length of the display unit 10 in the longitudinal direction can be made longer. Note that the video signal processing circuit 8 on the second board 5 may alternatively be mounted on the board 63 and the second board 5 and board 63 may be combined as a single board.

4. Car( Motorcar ) Navigation System

The display apparatus shown in FIG. 11 is for a car motorcar ) navigation system. As shown in FIG. 11, a fixed case 120 accommodates the above-mentioned display unit 10 and a CD player 61. Further, the fixed case 120 accommodates a movement mechanism 121 and control unit 122. The CD player 61 is positioned under the display unit 10. The control unit 122 is positioned behind the CD player 61. The fixed case 120, as shown in FIG. 9, has dimensions appropriate for an 1DIN space 71 of the console panel 70.

The display unit 10 is accommodated in the intermediate case 123 and can move forward and backward. The intermediate case 123 has guide rollers 124 at its left and right. These guide rollers 124 are guided on guide rails provided on the fixed case 120. Due to this, the intermediate case 123 can be moved horizontally. Further, when the intermediate case 123 is moved forward (left direction in figure) to an intermediate position of the fixed case 120, the forward movement of the intermediate case 123 is blocked by a locking mechanism, not shown. The rear end of the intermediate case 123 has the movement brackets 160 connected to it by guide pins 125. The movement mechanism 121 is accommodated in the movement brackets 160.

Figure 12:
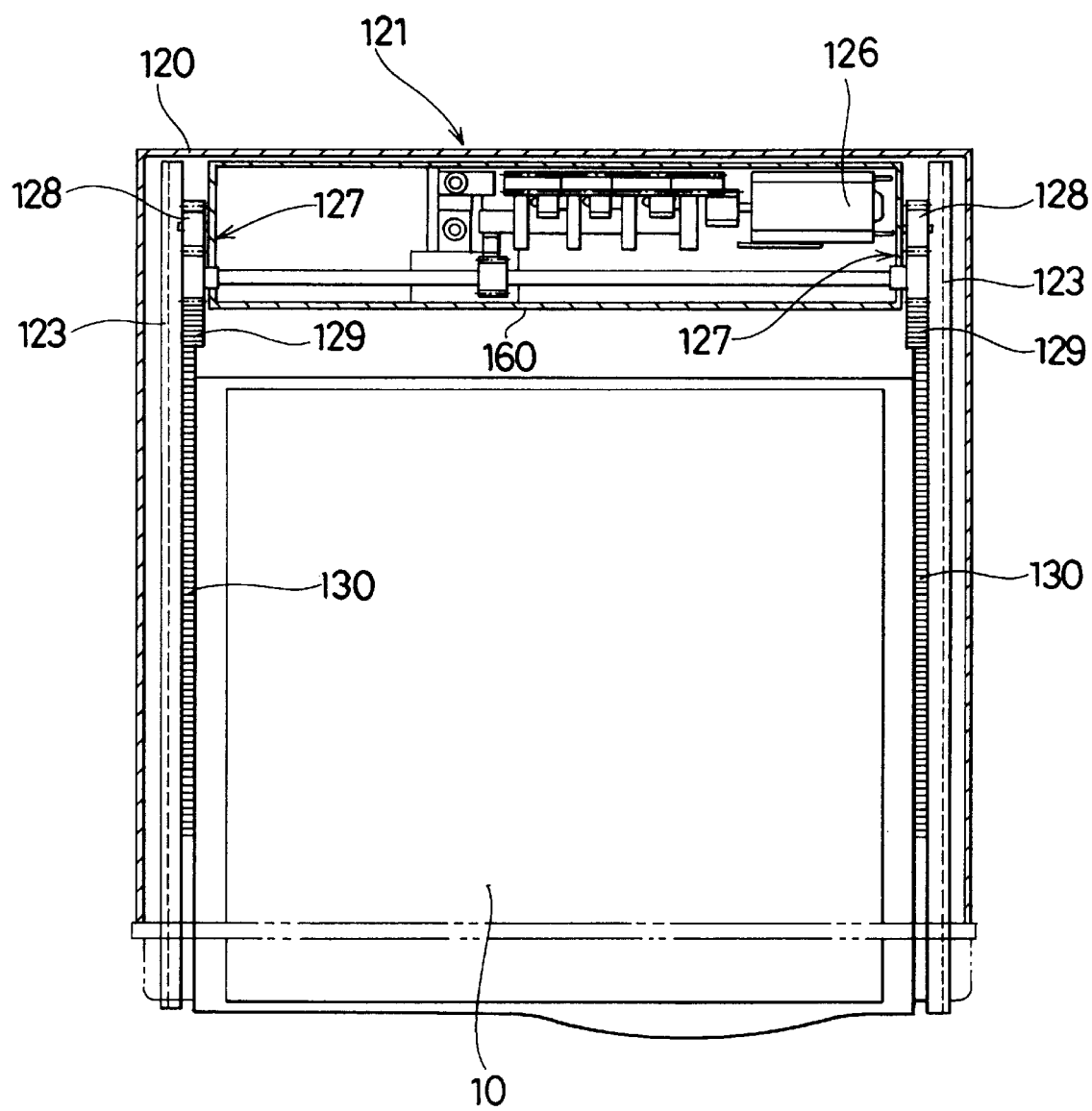
FIG. 12 is a plane view of the inside of a display apparatus.

As shown in FIG. 12, an electric motor 126 is provided at the movement mechanism 121. The rotation of the electric motor 126 is transmitted through a reduction gear train 127 to left and right pinions 128. Further, racks 129 are provided at the two edges of the fixed case 120. Racks 130 are also provided at the two edges of the intermediate case 123.

As shown in FIG. 11, at the left and right sides of the display unit 10, links 132 are supported in a rotatable fashion by pins 131. The links 132 are provided with small guide pins 133 near the pins 131. Further, at the rear ends of the links 132 there are provided large guide pins 134. The large guide pins 134 have diameters larger than the small guide pins 133.

Further, side plates 135 are formed at the left and right of the intermediate case 123. The side plates 135 are each formed with a first and second, that is, two, guide grooves 136 and 137. The first guide grooves 136 have straight portions 136a and curved portions 136b. The straight portions 136a extend substantially horizontally. The curved portions 136b are formed starting from the front ends of the straight portions 136a. The guide pins 125 move in the first guide grooves 136.

The second guide grooves 137 have first straight portions 137a and second straight portions 137b. The width of the first straight portions 137a is greater than the width of the second straight portions. The front ends of the second straight portions 137b open upward. Step differences 137c are formed between the first straight portions 137a and the second straight portions 137b.

Figure 13:
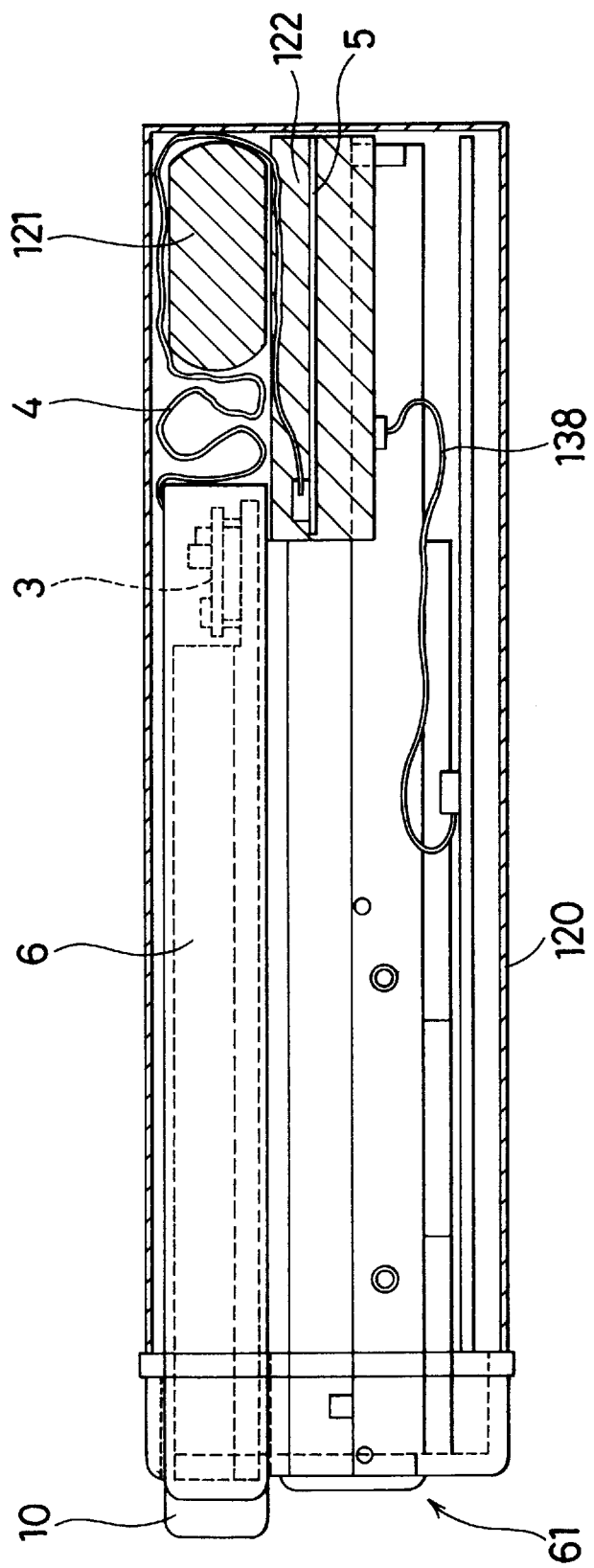
FIG. 13 is a cross-sectional side view of a display apparatus showing the arrangement of the connecting lines.

As shown in FIG. 13, the first board 3 in the display unit 10 and the second board 5 in the control unit 122 are connected by the extension cable 4. The CD player 61 is connected by a flat cable 138 to the control unit 122. The extension cable 4 is a flexible flat cable and is snaked around the back of the movement mechanism 121.

Below, an explanation will be made of the operation of the movement mechanism 121 and the display unit 10. FIG. 11 shows the state of the display unit 10 retracted in the fixed case 120. The intermediate case 123 is at the rearmost position of the fixed case 120, and the display unit 10 and movement mechanism 121 are at the rear of the intermediate case 123. In this state, the intermediate case 123 can be moved forward with respect to the fixed case 120. The intermediate case 123, the display unit 10, the movement brackets 160, and the movement mechanism 121 are locked together and move as a single unit.

When the electric motor 126 operates, the rotation of the electric motor 126 is transmitted through the reduction gear train 127 to the left and right pinions 128. These pinions 128 engage with the racks 129 of the fixed case 120, whereby the intermediate case 123, display unit 10, the movement brackets 160, and movement mechanism 121 move forward as one unit.

When the intermediate case 123 moves forward by exactly a predetermined distance, the forward movement of the intermediate case 123 is obstructed. At this time, the locked state of the intermediate case 123, display unit 10, the movement brackets 160, and movement mechanism 121 is released. The pinions 128 move to the racks 130 of the intermediate case 123, whereby the display unit 10, the movement brackets 160, and the movement mechanism 121 move further forward from the intermediate case 123. At this time, the guide pins 125 are guided to the straight portions 136a of the first guide grooves 136 while the large guide pins 134 are guided to the first straight portions 137a of the second guide grooves 137. The small guide pins 133 are guided from the first straight portions 137a to the second straight portions 137b. The display unit 10 is held horizontal by the small guide pins 133 and the guide pins 125.

Figure 14:
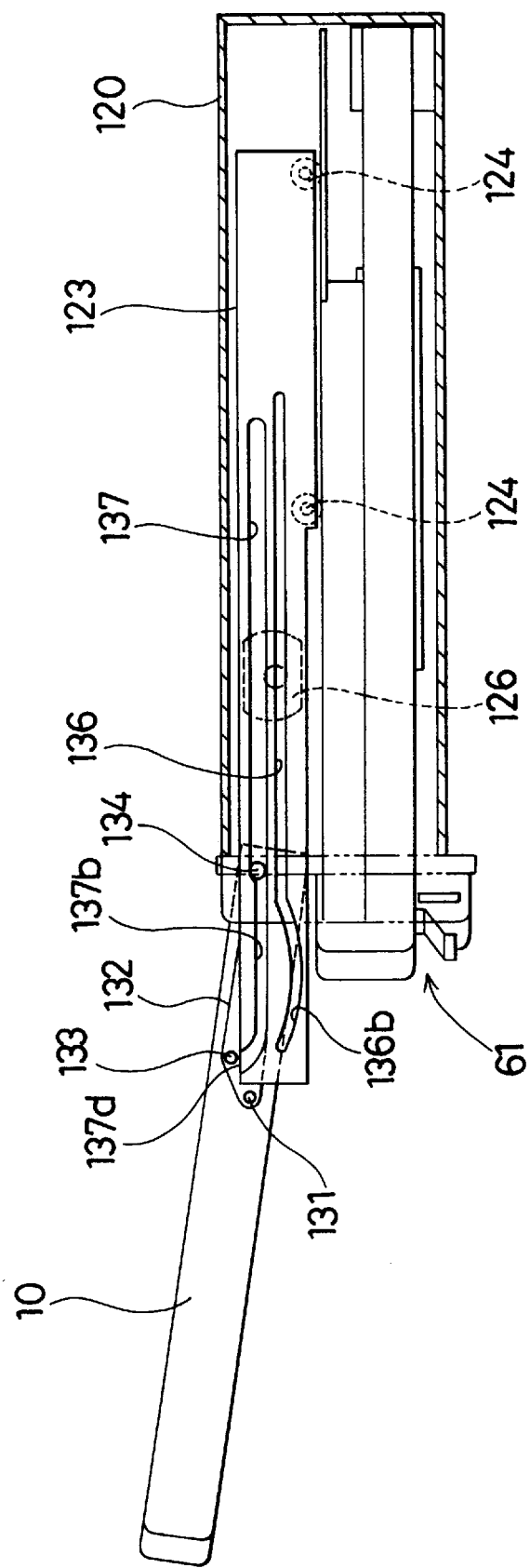
FIG. 14 is a cross-sectional side view of a display apparatus before the display unit is popped up.
Figure 15:
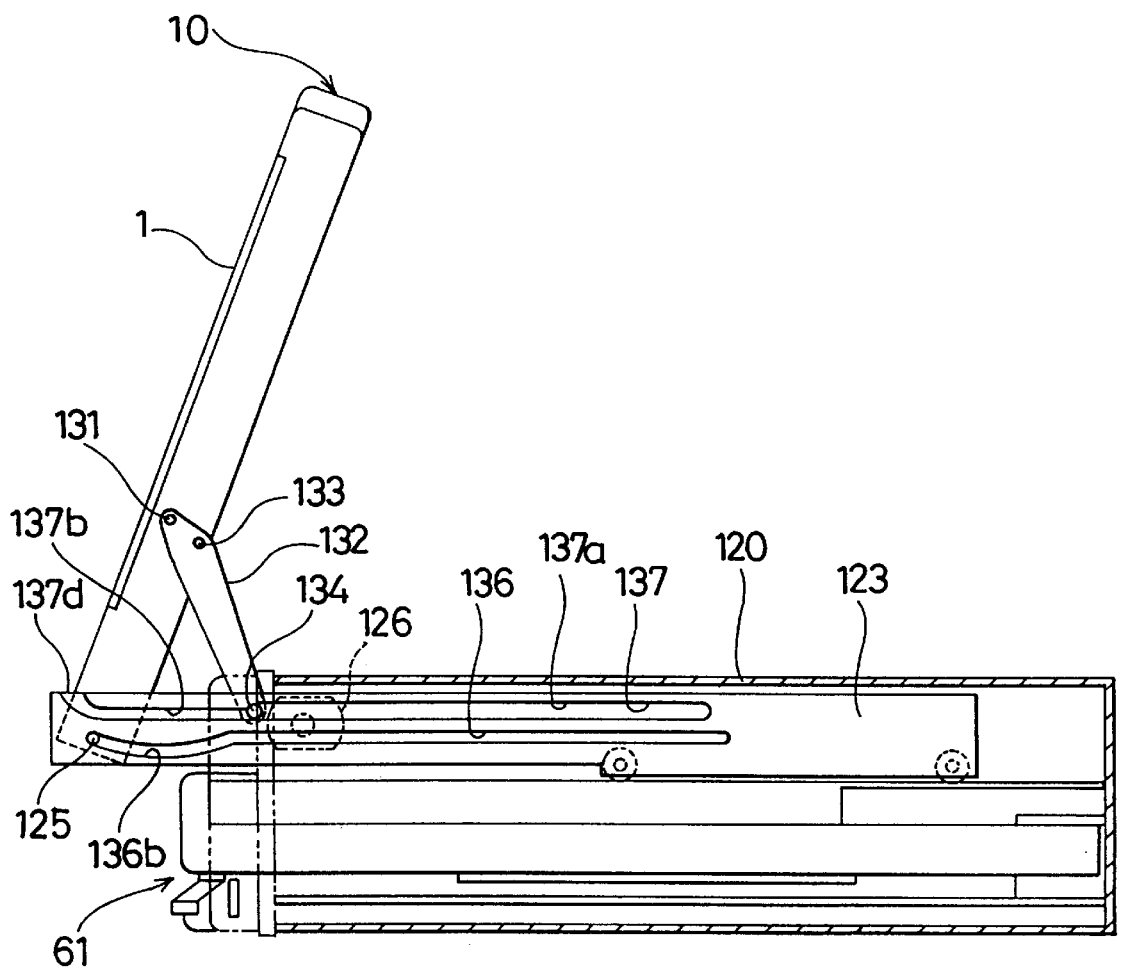
FIG. 15 is a cross-sectional side view of a display device at the time when the display unit is popped up.

As shown in FIG. 14, the display unit 10 moves further forward horizontally to exit from the fixed case 120. When the large guide pins 134 strike the step differences 137c, the forward movement of the display unit 10 is obstructed. The electric motor 126 continues operating even after this, however, so the movement mechanism 121 moves further forward. As a result, the guide pins 125 enter the curved portions 136b and the small guide pins 133 exit from the opening 137d. The display unit 10 swivels upward about the large guide pins 134. As shown in FIG. 15, further, when the guide pins 125 reach the front ends of the curved portions 136b, the electric motor 126 stops. As a result, the liquid crystal display panel 1 of the display unit 10 is swiveled toward the driver and the display unit 10 is held in the stand-up position. The navigation system can be used in this state.

On the other hand, when the display unit 10 is to be retracted into the fixed case 120, the electric motor 126 operates in reverse. Due to this, an operation opposite to the above is performed and the display unit 10 is returned to the position shown in FIG. 11.

Figure 16:
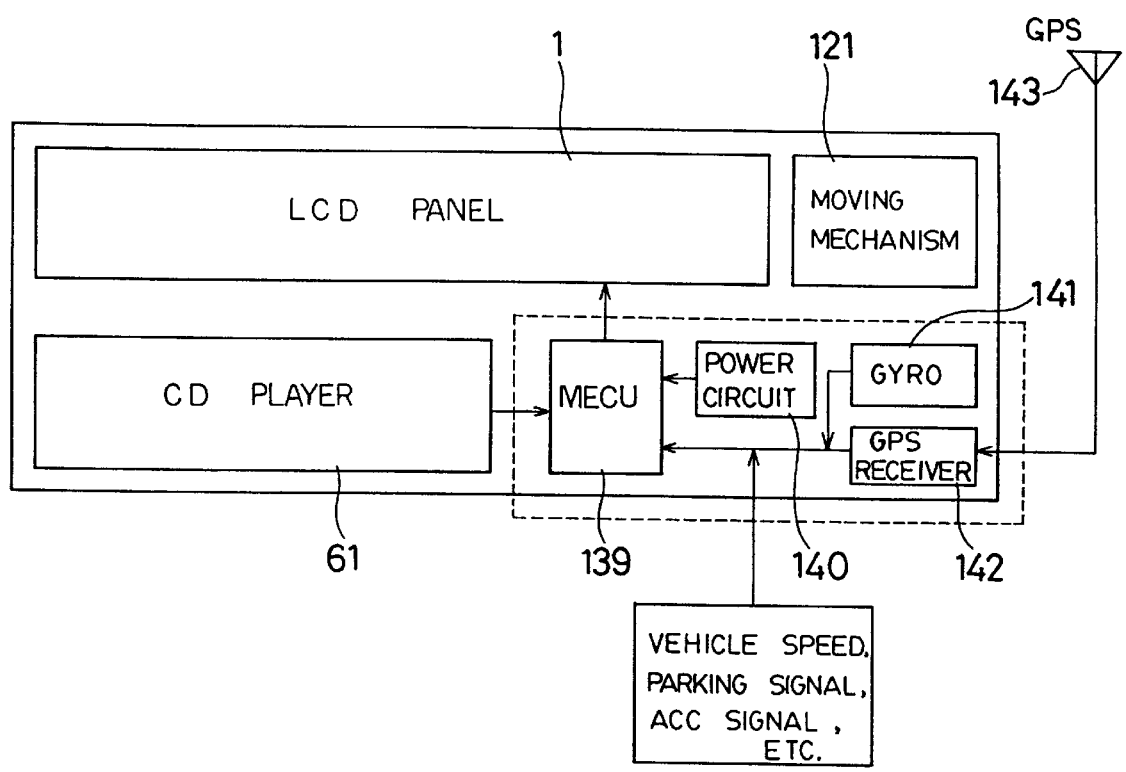
FIG. 16 is a block diagram of a car navigation system.

As described with reference to FIG. 16, a control unit accommodates a second board on which is mounted a video signal processing circuit which are not shown, the control circuit for the CD player 61, and a central control unit (MECU) 139 having control circuits for the navigation. Further, the control unit accommodates a power circuit 140, a gyroscope 141, and a GPS receiver 142. A GPS antenna 143 is used to receive the radio waves from a satellite.

The GPS receiver 142 receives as input a signal received by the GPS antenna 143. Map data stored in a CD-ROM is read by the CD player 61. Based on this map data, a map is displayed on the liquid crystal display panel 1. The central control unit 139 calculates the current position of the car, the direction of advance, etc. based on the signal from the gyroscope 141, the vehicle speed, parking signal, engine accessory signal (ACC) from the key switch, and other vehicle signals. The central control unit 139 then displays on the map shown on the display unit 10 the current location of the car, the destination, the route, the direction of advance, etc.

Figure 17:
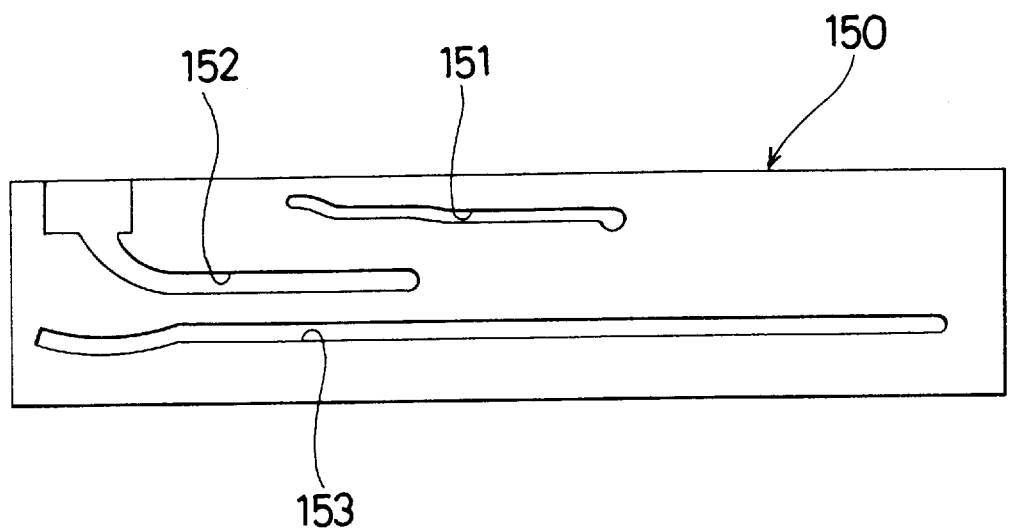
FIG. 17 is a side view of guide grooves of an intermediate case in a display device of the related art.
Figure 18:
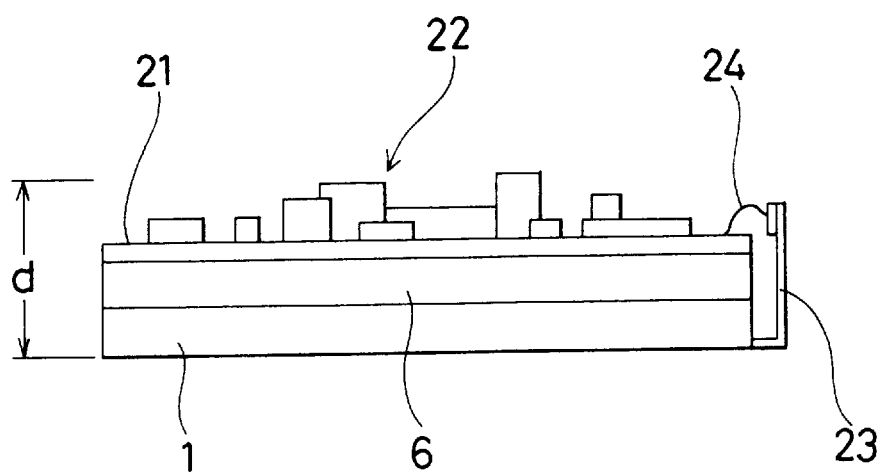
FIG. 18 is a side view of a display device of the related art.
Figure 19:
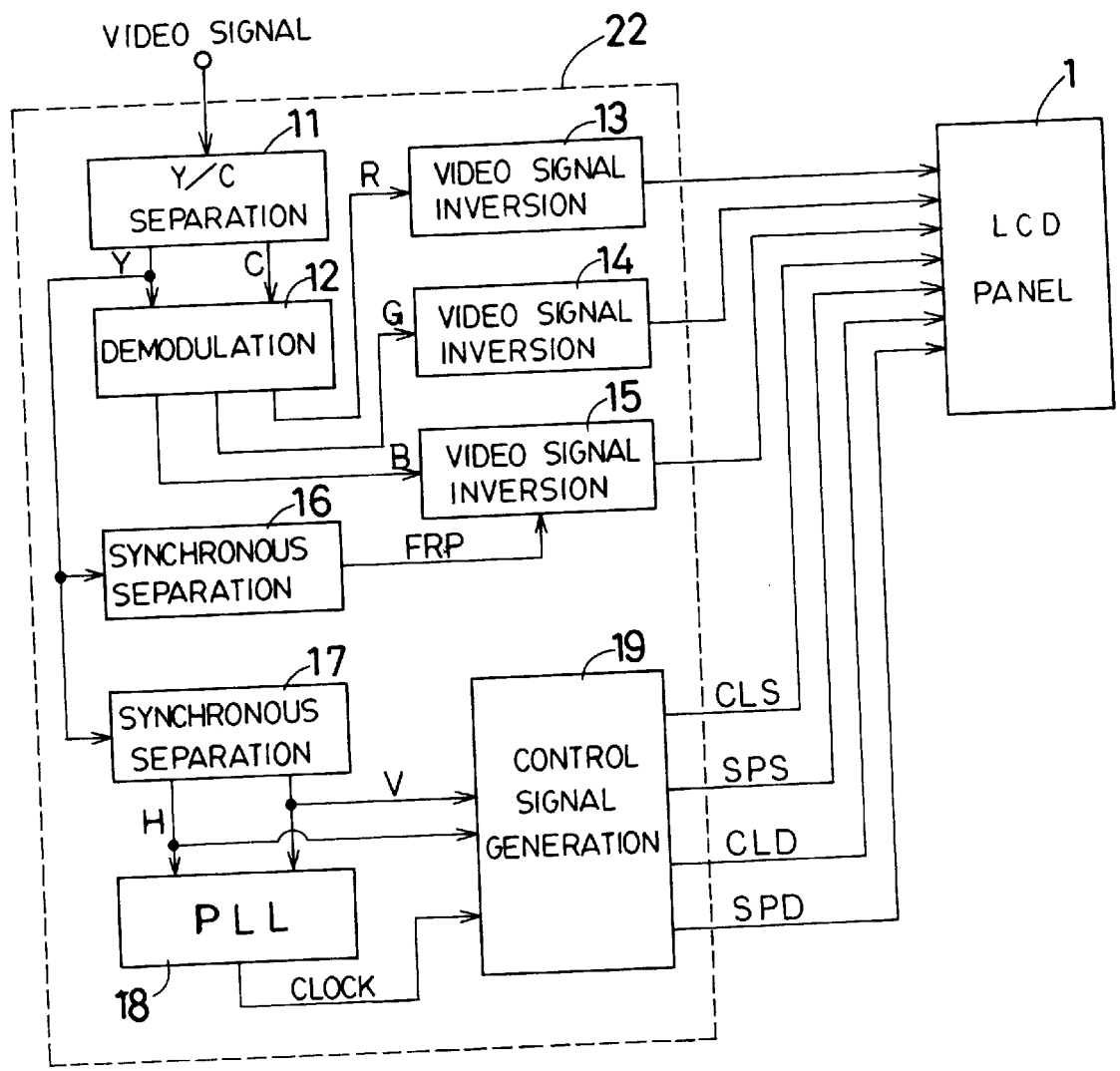
FIG. 19 is a block diagram of a display control circuit of the related art.

In the related art, as shown in FIG. 17, the intermediate case 150 was formed with the three guide grooves 151, 152, and 153 for guiding the above three guide pins 125, 133, and 134. Therefore, the intermediate case 150 could not be made thinner. As opposed to this, the present invention, as explained above, guides the three guide pins 125, 133, and 134 by the two guide grooves 136 and 137. Due to this, the intermediate case 123 can be made thinner matching the thickness of the display unit 10.

Note that the present invention is not limited to the above embodiments and may be modified to an extent not deviating from the gist of the present invention. For example, the liquid crystal display panel 1 may be a liquid crystal display panel other than a TFT one, for example, an STN (super twisted nematic) type, a color liquid crystal display panel, or a monochrome liquid crystal display panel. Further, the liquid crystal display panel 1 may be a plasmatic type, LED (light emitting diode) display, FED (field emission display), or other flat panel display. Also, the liquid crystal display panel 1 may be replaced by a flat CRT or television receiver or other display device.

Further, the display device of the present invention is not limited in application. For example, it may be used in the home, a car, boat, aircraft, etc. Also, the display drive circuit and display control circuit of the liquid crystal display panel 1 are not limited to those of the above embodiments and may be other configurations of a display drive circuit and display control circuit.

Also, the circuits and connecting lines arranged in the frame 2 of the liquid crystal display panel 1 are not limited to the synchronization control circuit 7 and the signal lines L and may be any circuits and signal lines in which problems arise due to entry of noises into the output signal. The circuits and signal lines for example may be the video signal inversion circuits 13 to 15, the demodulation circuit 12, or the synchronization separation circuit 16.

Further, the circuits and connecting lines arranged away from the liquid crystal display panel 1 through an extension cable 4 may be the synchronization separation circuit 17 etc. in addition to the circuits 11 to 16. Accordingly, the signals carried on the extension cable 4 may be the luminance signal Y, color signal C, primary color signals RGB, timing signal FPR, or vertical synchronization signal V, horizontal synchronization signal H, etc. The effects of noises on these signals can be corrected by the PLL circuit. In this case, the synchronization signals CLS, SPS, CLD, and SPD may be carried over the extension cable 4.

Further, the second board 5 may be accommodated movably back and forth in the case 51 and may be moved together with the display unit 10. In this case, the length of the extension cable 4 may be made shorter than the length of the display unit 10. Further, a plurality of the extension cables 4 and second boards 5 may be provided.

The configurations of the movement mechanisms 100 and 121 are not limited to the configurations illustrated in the above embodiments. Further, the movement mechanisms 100 and 121 may be changed into such where the display unit 10 is pulled out or retracted in the case 51 and fixed case 126 manually.

Also the circuit connected to the liquid crystal display panel 1 through the extension cable 4 is not limited to the video signal processing circuit 8 and may be a circuit including part of the control circuit of the liquid crystal display panel 1. This circuit may include for example the video signal generating circuit and may be a TV tuner circuit, a circuit in a video disk unit, a circuit in a TV game machine, or other circuit in the main body of a device generating video signals or part of such a circuit.

Further, the display apparatus of the present invention may be used as a display apparatus for a television and game machine or for a CD or other audio equipment in addition to a car navigation system.

The invention being thus described, it will be obvious that the same may be varied in many ways. Such variations are not to be regarded as a departure from the spirit and scope of the invention, and all such modifications as would be obvious to one skilled in the art are intended to be included within the scope o the following claims.

We claim:

1. A display apparatus for a car comprising;

a display unit for displaying images; and at least one display control circuit for controlling said display unit, at least one circuit portion or at least one connecting means of said at least one display control circuit, in which are generated or carried signals which suffer from waveform distortion and are susceptible to the effects of noise when signal lines between said at least one circuit portion or said at least one connecting means and said display unit become longer, being arranged near said display unit, and circuit portions and connecting means of said at least one display control circuit other than said at least one circuit portion and said at least one connecting means being arranged away from said display unit through at least one extension cable, said at least one circuit portion and said at least one connecting means comprise a digital synchronization control circuit and connecting lines for connecting said at least one display control circuit with said display unit and for generating or carrying the signals which cannot be corrected when affected by noise.

2. A display apparatus for a car comprising:

a flat display unit having a flat display for displaying images;

at least one display control circuit for controlling said flat display; and a movement mechanism for moving said flat display unit to stand up from a state in which a screen of said flat display unit is lying flat and to retract from the stand up position, at least one circuit portion or at least one connecting means of said at least one display control circuit, in which are generated or carried signals which suffer from waveform distortion and are susceptible to the effects of noise when signal lines between said at least one circuit portion or said at least one connecting means and said flat display unit become longer, being arranged near said flat display unit, and circuit portions and connecting means of said at least one display control circuit other than said at least one circuit portion and said at least one connecting means being arranged away from said flat display unit through at least one extension cable.

3. A display apparatus for a car comprising:

a flat display unit having a flat display for displaying images;

at least one display control circuit for controlling said flat display unit;

a flat box-shaped case of a thickness substantially equal to a thickness of said flat display unit for accommodating said flat display unit and said at least one display control circuit; and a movement mechanism, provided in said flat box-shaped case, for moving said flat display unit to exit and stand up from an opening provided at a front end of said flat box-shaped case and to retract into said flat box-shaped case from said opening, at least one circuit portion or at least one connecting means of said at least one display control circuit, in which are generated or carried signals which suffer from waveform distortion and are susceptible to the effects of noise when signal lines between said at least one circuit portion or said at least one connecting means and said flat display unit become longer, being arranged inside said flat display unit, and circuit portions and connecting means of said at least one display control circuit other than said at least one circuit portion and said at least one connecting means being accommodated in said flat box-shaped case away from said flat display unit through at least one extension cable.

4. The display apparatus for a car as set forth in claim 1, wherein the waveform distortion comprises distortions which make a level of low level components of the signals become higher, a level of high level components of the signals become lower, and the level of the low level components and the level of the high level components of the signals approach each other.

5. The display apparatus for a car as set forth in claim 1, wherein the signals which suffer from waveform distortion and are susceptible to the effects of noise when the signal lines become longer are signals for determining and controlling position of pixels or frames on a screen of said display unit.

6. The display apparatus for a car as set forth in claim 1, wherein the signals carried on the at least one extension cable are signals for determining and controlling color, brightness, or luminance on a screen of said display unit.

7. A display apparatus for a car comprising:

a thin display for displaying images;

luminance signal means for receiving video signals relating to pictures to be displayed on said thin display and for separating and generating luminance signals from the video signals;

synchronization control means for separating and generating various types of driving control signals from the luminance signals separated and generated by said luminance signal means and for sending the driving control signals to said thin display;

color signal means for receiving the video signals, separating and generating color signals from the video signals, separating and generating from the color signals primary color signals with luminances in accordance with the luminance signals, and sending the primary color signals to said thin display;

at least one first circuit board, on which said synchronization control means is mounted, adjoining at least one side edge of said thin display;

at least one second circuit board, on which said luminance signal means and said color signal means are mounted;

flexible first connecting means for carrying the luminance signals sent from said luminance signal means to said synchronization control means;

flexible second connecting means for carrying the primary color signals sent from said color signal means to said thin display, said flexible second connecting means being provided integrally along with said flexible first connecting means; and third connecting means for carrying the driving control signals sent from said synchronization control means to said thin display, said flexible first and second connecting means being longer than said third connecting means or longer or substantially equal to a length or a width of said thin display, said flexible first and second connecting means carrying the luminance signals and the primary color signals which are resistant to noise, said third connecting means carrying the driving control signals which are susceptible to noise, said flexible first and second connecting means enabling said at least one second circuit board to be arranged away from said at least one first control board.

8. A display apparatus for a car comprising:

a flat display for displaying a picture;

luminance signal means for receiving video signals relating to pictures to be displayed on said flat display and for separating and generating luminance signals from the video signals;

synchronization control means for separating and generating various types of driving control signals from the luminance signals separated and generated by said luminance signal means and for sending the driving control signals to said flat display;

color signal means for receiving the video signals, separating and generating color signals from the video signals, separating and generating from the color signals primary color signals with luminances in accordance with the luminance signals, and sending the primary color signals to said flat display;

at least one first circuit board, on which said synchronization control means is mounted, adjoining at least one side edge of said flat display;

a flat display unit accommodating said flat display and said at least one first circuit board;

at least one second circuit board, on which said luminance signal means and said color signal means are mounted;

flexible first connecting means for carrying the luminance signals sent from said luminance signal means to said synchronization control means, said flexible first connecting means being longer than a length of said flat display unit in a longitudinal direction;

flexible second connecting means for carrying the primary color signals sent from said color signal means to said flat display unit, said flexible second connecting means being provided integrally along with said flexible first connecting means and being longer than the length of said flat display unit in the longitudinal direction;

third connecting means for carrying the driving control signals sent from said synchronization control means to said flat display;

a thin box-shaped case for accommodating said flat display, said at least one first circuit board, said at least one second circuit board, said flexible first and second connecting means and said third connecting means, said thin box-shaped case having a length in the longitudinal direction longer than the length of said flat display unit in the longitudinal direction and having a thickness substantially equal to a thickness of said flat display unit; and a movement mechanism provided in said thin box-shaped case for moving said flat display unit to exit and then stand up from an opening made at a front end of said thin box-shaped case and to retract into said thin box-shaped case from said opening, said flexible first and second connecting means carrying the luminance signals and the primary color signals which are resistant to noise, said third connecting means carrying the driving control signals which are susceptible to noise, and said at least one second circuit board being arranged away from said at least one first circuit board by said flexible first and second connecting means and being fixed at a rear of an inside of said thin box-shaped case.

9. A display apparatus for a car comprising:

a flat liquid crystal display panel for displaying a picture;

at least one backlight arranged at a rear surface of said flat liquid crystal display panel for lighting a screen of said flat liquid crystal display panel from behind;

luminance signal means for receiving video signals relating to pictures to be displayed on said flat liquid crystal display panel and for separating and generating luminance signals from the video signals;

synchronization control means for separating and generating various types of driving control signals from the luminance signals separated and generated by said luminance signal means and for sending the driving control signals to said flat liquid crystal display panel;

color signal means for receiving the video signals, separating and generating color signals from the video signals, separating and generating from the color signals primary color signals with luminances in accordance with the luminance signals, and sending the primary color signals to said flat liquid crystal display panel;

at least one first circuit board, on which said synchronization control means is mounted, adjoining at least one side edge of said flat liquid crystal display panel;

a flat display unit accommodating said flat liquid crystal display panel, said at least one backlight, and said at least one first circuit board;

at least one second circuit board on which said luminance signal means and said color signal means are mounted;

flexible first connecting means for carrying the luminance signals sent from said luminance signal means to said synchronization control means, said flexible first connecting means being longer than a length of said flat display unit in the longitudinal direction;

flexible second connecting means for carrying the primary color signals sent from said color signal means to said flat liquid crystal display panel, said flexible second connecting means being provided integrally along with said flexible first connecting means and being longer than the length of said flat display unit in the longitudinal direction;

third connecting means for carrying the driving control signals sent from said synchronization control means to said flat liquid crystal display panel;

a thin box-shaped case for accommodating said flat liquid crystal display panel, said at least one first circuit board, said at least one second circuit board, said flexible first and second connecting means and said third connecting means, said thin box-shaped case having a length in the longitudinal direction longer than the length of said flat display unit in the longitudinal direction and having a thickness substantially equal to a thickness of said flat display unit; and a movement mechanism provided in said thin box-shaped case for moving said flat display unit to exit and then stand up from an opening made at a front end of said thin box-shaped case and to retract into said thin box-shaped case from said opening, said flexible first and second connecting means carrying the luminance signals and the primary color signals which are resistant to noise, said third connecting means carrying the driving control signals which are susceptible to noise, and said at least one second circuit board being arranged away from said at least one first circuit board by said flexible first and second connecting means and being fixed at a rear of an inside of said thin box-shaped case.

10. The display apparatus for a car as set forth in claim 3, wherein said flat box-shaped case is provided with at least one portion for accommodating another device below or above a portion accommodating said flat display unit.

11. The display apparatus for a car as set forth in claim 3, wherein said flat box-shaped case accommodates a CD player below or above a portion for accommodating said flat display unit, said flat box-shaped case further accommodating at least one control unit for providing car navigation information.

12. The display apparatus for a car as set forth in claim 3, wherein said flat display unit displays car navigation information.

13. The display apparatus for a car as set forth in claim 3, wherein said flat box-shaped case can be accommodated in a 1DIN space.

14. The display apparatus for a car as set forth in claim 1, said display unit comprising:

an intermediate case supported in a manner enabling movement with respect to a fixed case to an intermediate position in a forward direction and being restricted in movement in the forward direction at the intermediate position, said display unit being supported in a manner enabling movement with respect to said intermediate case;

a movement mechanism connected rotatably to said display unit and having at least one drive unit; and links connected rotatably to two sides of said display unit, a driving force of said at least one drive unit being used to move said intermediate case forward to the intermediate position, further move said display unit and said movement mechanism forward with respect to said intermediate case at the intermediate position, and swivel said display unit to a stand-up position, the display apparatus further comprising guide pins provided at said movement mechanism, large diameter guide pins provided at said links, small diameter guide pins provided at said links and having diameters smaller than said large diameter guide pins, first guide grooves, provided at sides of said intermediate case, having curved portions at front ends thereof for guiding said guide pins, and second guide grooves, provided at the sides of said intermediate case, having first straight portions for guiding said large diameter guide pins and said small diameter guide pins, second straight portions for guiding said small diameter guide pins and having front ends opening upward, and step differences positioned at connecting portions of said first and second straight portions for restricting forward movement of said large diameter guide pins and allowing movement of said small diameter guide pins to said second straight portions.

15. The display apparatus for a car as set forth in claim 14, wherein said fixed case is provided with at least one portion for accommodating another device below or above a portion which accommodates said display unit.

16. The display apparatus for a car as set forth in claim 14, wherein said fixed case accommodates a CD player below or above a portion which accommodates said display unit, said fixed case further accommodating at least one control unit for controlling display of car navigation information.

17. The display apparatus for a car as set forth in claim 14, wherein said display unit displays car navigation information.

18. The display apparatus for a car as set forth in claim 14, wherein said fixed case is of a size enabling housing in a 1DIN space.

19. The display apparatus for a car of claim 1, wherein said display unit has a flat display, the display apparatus further comprising:

a flat box-shaped case of a thickness substantially equal to a thickness of said display unit, said at least one display control circuit and a movement mechanism, said movement mechanism being provided in said flat box-shaped case for moving said display unit to exit and stand up from an opening provided at a front end of said flat box-shaped case and to retract into said flat box-shaped case from said opening, said circuit portions and said connecting means of said at least one display control circuit other than said at least one circuit portion and said at least one connecting means being accommodated in said flat box-shaped case away from said display unit through the at least one extension cable.

20. A display apparatus for a car comprising:

a display unit for displaying images; and at least one display control circuit for controlling said display unit, at least one circuit portion or at least one connecting means of said at least one display control circuit, in which are generated or carried signals which suffer from waveform distortion and are susceptible to the effects of noise when signal lines between said at least one circuit portion or said at least one connecting means and said display unit become longer, being arranged near said display unit, and circuit portions or connecting means of said at least one display control circuit other than said at least one circuit portion or said at least one connecting means being arranged away from said display unit through at least one extension cable, said display unit comprising a liquid crystal display for displaying the images on a viewing surface, and a backlight, arranged along a back surface of said liquid crystal display opposite said viewing surface, for illuminating said liquid crystal display, said at least one circuit portion and said at least one connecting means being arranged near said display unit such that nothing is mounted on a rear surface of said backlight.

21. The display apparatus for a car according to claim 2, wherein said flat display unit further comprises a backlight, arranged along a back surface of said flat display opposite a viewing surface of said flat display, for illuminating said flat display, said at least one circuit portion and said at least one connecting means being arranged near said flat display unit such that nothing is mounted on a rear surface of said backlight.

22. The display apparatus for a car according to claim 3, wherein said flat display unit further comprises a backlight, arranged along a back surface of said flat display opposite a viewing surface of said flat display for illuminating said flat display, said at least one circuit portion and said at least one connecting means being arranged near said flat display unit such that nothing is mounted on a rear surface of said backlight.

23. A display apparatus for a car comprising:

a liquid crystal display having a viewing surface for displaying images;

a backlight, having a first surface arranged along a back surface of said liquid crystal display opposite said viewing surface, for illuminating said liquid crystal display;

a first control circuit, coupled to said liquid crystal display, for generating control signals for controlling display of images on said liquid crystal display, said first control circuit including circuit elements which are susceptible to noise which distorts the control signals, said first control circuit, said liquid crystal display and said backlight being provided within a housing such that no circuit elements are on a second surface of said backlight opposite said first surface;

a second control circuit, arranged within said display apparatus outside of said housing and being coupled to said liquid crystal display and said first control circuit, for generating additional control signals for further controlling display of images on said liquid crystal display, said second control circuit including circuit elements that are not susceptible to noise; and a moving mechanism for moving said housing to extend out of an opening of the display apparatus, to rotate into an upright position and to retract said housing into the display apparatus.

* * * * *